(12) United States Patent
Hiwatashi

(10) Patent No.: US 7,462,412 B2
(45) Date of Patent: *Dec. 9, 2008

(54) SOLID OXIDE FUEL CELL

(75) Inventor: Kenichi Hiwatashi, Fukuoka (JP)

(73) Assignee: Toto Ltd., Fukuoka (JP)

(*) Notice: Subject to any disclaimer, the term of this patent is extended or adjusted under 35 U.S.C. 154(b) by 324 days.

This patent is subject to a terminal disclaimer.

(21) Appl. No.: 11/071,114

(22) Filed: Mar. 4, 2005

(65) Prior Publication Data

US 2006/0199058 A1    Sep. 7, 2006

(51) Int. Cl.
*H01M 8/00* (2006.01)

(52) U.S. Cl. .............. 429/12; 429/30; 429/33; 429/40; 429/41; 429/46

(58) Field of Classification Search .......... 429/30, 429/12, 33, 40, 41, 46
See application file for complete search history.

(56) References Cited

U.S. PATENT DOCUMENTS 6,492,051 B1 * 12/2002 Gopalan et al. ............ 429/31
6,558,831 B1 *  5/2003 Doshi et al. ............... 429/30

FOREIGN PATENT DOCUMENTS

| JP | 7-6774 A     | 1/1995  |
|----|--------------|---------|
| JP | 10-158894 A  | 6/1998  |
| JP | 2813355 A    | 8/1998  |
| JP | 11-273451 A  | 10/1999 |
| JP | 11-335164 A  | 12/1999 |
| JP | 2002-15756 A | 1/2002  |

* cited by examiner

*Primary Examiner*—Jane Rhee
(74) *Attorney, Agent, or Firm*—Carrier, Blackman & Associates, P.C.; Joseph P. Carrier; William D. Blackman

(57) ABSTRACT

The present invention provides an electrolyte membrane of a solid oxide fuel cell that excels in output performance. There is provided a solid oxide fuel cell comprising a single cell having an air electrode disposed on a surface of an electrolyte membrane and a fuel electrode disposed on the other surface the electrolyte membrane, and an interconnector having a role of electrical connection; wherein the electrolyte membrane is provided with a first layer composed of a material having an oxygen-ionic conductivity of S1 on the air-electrode side, a third layer composed of a material having an oxygen-ionic conductivity of S3 on the fuel-electrode side, and a second layer composed of a material containing at least zirconia and having an oxygen-ionic conductivity of S2 between the first layer and the third layer; and wherein the oxygen-ionic conductivity of S1 and the oxygen-ionic conductivity of S2 have a relationship of S1>S2, and the oxygen-ionic conductivity of S3 and the oxygen-ionic conductivity of S2 have a relationship of S3>S2.

34 Claims, 2 Drawing Sheets

SOLID OXIDE FUEL CELL

BACKGROUND OF THE INVENTION

1. Field of the Invention

The present invention relates to a solid oxide fuel cell that excels in output performance. Specifically, the present invention relates to a solid oxide fuel cell having an electrolyte membrane free of gas permeability that excels in oxygen-ionic conductivity, and having a high output performance even at a power-generating temperature of 900° C. or below.

2. Description of the Related Art

As an electrolyte membrane for a conventional solid oxide fuel cell, a layer composed of yttria-doped zirconia (hereafter referred to as YSZ) has been proposed. (For example, see Patent Document 1.) Since YSZ excels in sintering properties, it is possible to easily fabricate an electrolyte membrane free of gas permeability; however, there has been a problem that the output performance of a solid oxide fuel cell using this material for the electrolyte membrane is deteriorated because the oxygen-ionic conductivity of the electrolyte membrane is decreased at low temperatures of 900° C. or below, and the reaction of Equation (1) occurring between the air electrode and the electrolyte membrane cannot be efficiently promoted.

$$\tfrac{1}{2}O_2 + 2e^- \rightarrow O^{2-} \tag{1}$$

The electrolyte membrane free of gas permeability used herein is evaluated by the gas permeability of the gas permeated between one side and the opposite side of the electrolyte membrane when pressure difference is created between them, and has a gas permeability $Q \leq 2.8 \times 10^{-9}\ ms^{-1}Pa^{-1}$ (more preferably $Q \leq 2.8 \times 10^{-10}\ ms^{-1}Pa^{-1}$).

As an electrolyte membrane for a solid oxide fuel cell, a layer composed of scandia-doped zirconia (hereafter referred to as SSZ) has been proposed. (For example, see Patent Document 2.) Since SSZ has a higher oxygen-ionic conductivity than YSZ, it is expected that the output performance of a solid oxide fuel cell is elevated if this material is adopted as the electrolyte membrane. However, although the present inventors fabricated an electrolyte membrane using the material described in Patent Document 2, as a result of the test conducted by the present inventors, it was difficult to fabricate an electrolyte membrane free of gas permeability.

As an electrolyte membrane for a solid oxide fuel cell, a layer composed of ceria doped with samaria, gadolinia or the like has been proposed. (For example, see Patent Documents 3 and 4.) Since the material proposed in Patent Documents 3 and 4 has electronic conductivity in a fuel-gas environment of the solid oxide fuel cell, there has been a problem that the output performance is deteriorated if the electrolyte membrane is composed of the proposed materials only.

As an electrolyte membrane for a solid oxide fuel cell, a layer composed of lanthanum gallate has been proposed. (For example, see Patent Documents 5 and 6.) When a manganese-containing oxide, such as lanthanum manganite, is adopted as the air electrode of the solid oxide fuel cell, electronic conductivity is produced in the material proposed in Patent Documents 5 and 6 due to diffusion of manganese components, and there has been a problem that the output performance is deteriorated if the electrolyte membrane is composed of the proposed materials only.

[Patent Document 1] Japanese Patent Application Publication No. 10-158894 (p. 1-6, FIGS. 1-12)

[Patent Document 2] Japanese Patent Application Publication No. 7-6774 (p. 1-5, FIGS. 1-5)

[Patent Document 3] Japanese Patent Application Publication No. 11-273451 (p. 1-8, FIGS. 1-5)

[Patent Document 4] Japanese Patent No. 2813355 (p. 1-5, FIGS. 1-5)

[Patent Document 5] Japanese Patent Application Publication No. 2002-15756 (p. 1-9, FIGS. 1-9)

[Patent Document 6] Japanese Patent Application Publication No. 11-335164 (p. 1-12, FIGS. 1-12)

SUMMARY OF THE INVENTION

The object of the present invention is to solve the above problems, and to provide a solid oxide fuel cell having excellent output performance by optimizing the materials in an electrolyte membrane.

In order to achieve the above object, the present invention provides a solid oxide fuel cell comprising a single cell having an air electrode disposed on a surface of an electrolyte membrane and a fuel electrode disposed on the other surface of the electrolyte membrane, and an interconnector having a role of electrical connection; wherein the electrolyte membrane is provided with a first layer composed of a material having an oxygen-ionic conductivity of S1 on the air-electrode side, a third layer composed of a material having an oxygen-ionic conductivity of S3 on the fuel-electrode side, and a second layer composed of a material containing at least zirconia and having an oxygen-ionic conductivity of S2 between the first layer and the third layer; and wherein the oxygen-ionic conductivity of S1 and the oxygen-ionic conductivity of S2 have a relationship of S1>S2, and the oxygen-ionic conductivity of S3 and the oxygen-ionic conductivity of S2 have a relationship of S3>S2.

Since the electrolyte membrane according to the present invention has a structure in which layers composed of a material having a high oxygen-ionic conductivity are formed on the surfaces contacting the air electrode and the fuel electrode, and a layer composed of a material containing at least zirconia is interposed between the layers, a solid oxide fuel cell having excellent output performance can be provided.

The reason is that oxygen ion formed by the reaction of Equation (1) that occurs between the air electrode and the electrolyte membrane can be efficiently supplied to the electrolyte membrane; the electrolyte membrane has no gas permeability because of the presence of the second layer, thereby allowing oxygen ion to be efficiently supplied to the fuel-electrode side, and the reactions of Equations (2) and (3) that occur between the electrolyte membrane and the fuel electrode can be efficiently promoted.

$$\tfrac{1}{2}O_2 + 2e^- \rightarrow O^- \tag{1}$$

$$H_2 + O^{2-} \rightarrow H_2O + 2e^- \tag{2}$$

$$CO + O^{2-} \rightarrow CO_2 + 2e^- \tag{3}$$

It is reported that the above Equation (2) is a two-stage reaction of Equations (4) and (5) in a case of being strictly explained. If the reaction is described using Ni as an example, it is as follows:

$$O^{2-} + Ni \rightarrow NiO + 2e^- \tag{4}$$

$$NiO + H_2 \rightarrow Ni + H_2O \tag{5}$$

However, since it is difficult to strictly separate the above reactions, the electrode reaction is described by Equation (2), that is, Equation (4)+(5) in the present specification.

In a preferred embodiment of the present invention, the first layer composed of a material with an oxygen-ionic conductivity of S1 has the same composition as the third layer with an oxygen-ionic conductivity of S3.

According to the present invention, since the same material having a high oxygen-ionic conductivity is disposed on the air-electrode side and the fuel-electrode side, and a material containing at least zirconia is disposed in between, a solid oxide fuel cell having excellent output performance can be provided.

The reason is because oxygen ion formed by the reaction of Equation (1) that occurs between the air electrode and the electrolyte membrane can be efficiently supplied to the electrolyte membrane; the electrolyte membrane has no gas permeability because of the presence of the second layer, thereby allowing oxygen ion to be efficiently supplied to the fuel-electrode side, and the reactions of Equations (2) and (3) that occur between the electrolyte membrane and the fuel electrode can be efficiently promoted.

In a preferred embodiment of the present invention, the thickness of the second layer in the electrolyte membrane is 10 to 90% of the total thickness of the electrolyte membrane.

According to the present invention, a low-cost solid oxide fuel cell having excellent output performance can be provided by adjusting the thickness of the second layer in the electrolyte membrane to be within the above-described range.

The reason is that if the thickness of the second layer is less than 10%, there is a problem that the cost of the material for the electrolyte membrane is impractically high, or an electrolyte membrane free of gas permeability cannot be easily fabricated. On the other hand, if the thickness of the second layer is more than 90%, the oxygen-ionic conductivity of the electrolyte membrane in total is lowered, the oxygen ion formed in Equation (1) cannot be efficiently supplied to the fuel-electrode side, and the output performance is deteriorated.

In a preferred embodiment of the present invention, the thickness of the second layer is 20 to 70% of the total thickness of the electrolyte membrane.

According to the present invention, an electrolyte membrane having high oxygen-ionic conductivity free of gas permeability can be easily fabricated by adjusting the thickness of the second layer in the electrolyte membrane to be within the above further-limited range, and thereby a solid oxide fuel cell having excellent output performance can be provided.

The reason is that if the thickness of the second layer is less than 20%, there is a possibility that the cost of the material for the electrolyte membrane is somewhat high, or an electrolyte membrane free of gas permeability cannot be easily fabricated at a low temperature. On the other hand, if the thickness of the second layer is more than 70%, there is a possibility that the oxygen-ionic conductivity of the electrolyte membrane in total is somewhat low, and the output performance is deteriorated in power generation at a temperature of 900° C. or below.

In a preferred embodiment of the present invention, the material of the second layer in the electrolyte membrane is YSZ.

By making an electrolyte membrane contain a YSZ material, the electrolyte membrane free of gas permeability can be easily fabricated, and a solid oxide fuel cell having excellent output performance can be provided.

The reason is that since the YSZ material has high sintering properties, and can form an electrolyte membrane free of gas permeability at a low temperature, deterioration of the output performance due to reaction between the electrodes or diffusion of the Mn components can be suppressed.

In a preferred embodiment of the present invention, the material of the second layer in the electrolyte membrane is zirconia doped with at least scandia and yttria (hereafter referred to as ScYSZ).

By making an electrolyte membrane contain an ScYSZ material, the electrolyte membrane free of gas permeability can be easily fabricated, and a solid oxide fuel cell having excellent output performance can be provided.

The reason is that since the ScYSZ material has high sintering properties, and can form an electrolyte membrane free of gas permeability at a low temperature, deterioration of the output performance due to reaction between the electrodes or diffusion of the Mn components can be suppressed.

In a preferred embodiment of the present invention, the material of the first layer and the third layer is SSZ.

By using an SSZ material in the air-electrode side and the fuel-electrode side of the electrolyte membrane, since an electrolyte membrane having excellent oxygen-ionic conductivity free of gas permeability can be fabricated, a solid oxide fuel cell having excellent output performance can be provided.

The reason is that since an SSZ material having high oxygen-ionic conductivity is used in the air-electrode side and the fuel-electrode side, the reaction of Equation (1) that occurs between the air electrode and the electrolyte membrane, and the reactions of Equations (2) and (3) that occur between the electrolyte membrane and the fuel electrode can be efficiently performed, and since the second layer is formed between the SSZ layers, an electrolyte membrane free of gas permeability can be fabricated at a low temperature.

In a preferred embodiment of the present invention, the material of the first layer in the electrolyte membrane is a cerium-containing oxide represented by a general formula $(CeO_2)_{1-2x}(B_2O_3)_x$ (where B is any one of Sm, Gd and Y, $0.05 \leq X \leq 0.15$), and the material of the third layer is scandia-doped zirconia. By using a cerium-containing oxide represented by a general formula $(CeO_2)_{1-2x}(B_2O_3)_x$ (where B is any one of Sm, Gd and Y, $0.05 \leq X \leq 0.15$) in the air-electrode side of the electrolyte membrane, and using an SSZ material in the fuel-electrode side, a solid oxide fuel cell having excellent output performance can be provided.

The reason is that since a cerium-containing oxide layer having the above-described composition is formed on the air-electrode side, the reaction of Equation (1) that occurs between the air electrode and the electrolyte membrane can be efficiently promoted; since an SSZ material layer having high oxygen-ionic conductivity is formed on the fuel-electrode side, the reactions of Equations (2) and (3) that occur between the electrolyte membrane and the fuel electrode can be efficiently promoted; and since the second layer composed at least of a zirconia-containing material is formed, an electrolyte membrane free of gas permeability can be formed.

In a preferred embodiment of the present invention, the first layer in the electrolyte membrane is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr), and the third layer is composed of an SSZ material.

Since an electrolyte membrane having excellent oxygen-ionic conductivity free of gas permeability can be fabricated by forming a lanthanum galilate layer having the above-described composition on the air-electrode side of the electrolyte membrane, and forming an SSZ material layer on the fuel-electrode side of the electrolyte membrane, a solid oxide fuel cell having excellent output performance can be provided.

The reason is that since the above-described lanthanum gallate material has high oxygen-ionic conductivity, the reaction of Equation (1) that occurs between the air electrode and the electrolyte membrane can be efficiently promoted; since an SSZ material layer having high oxygen-ionic conductivity is formed on the fuel-electrode side, the reactions of Equations (2) and (3) that occur between the electrolyte membrane and the fuel electrode can be efficiently promoted; and since the second layer composed at least of a zirconia-containing material is formed, an electrolyte membrane free of gas permeability can be formed at a low temperature.

In a preferred embodiment of the present invention, the first layer in the electrolyte membrane is composed of an ScYSZ material, and the third layer is composed of an SSZ material.

Since an electrolyte membrane having excellent oxygen-ionic conductivity free of gas permeability can be fabricated by forming an ScYSZ material layer on the air-electrode side of the electrolyte membrane, and forming an SSZ material layer on the fuel-electrode side of the electrolyte membrane, a solid oxide fuel cell having excellent output performance can be provided.

The reason is that since an ScYSZ material having excellent sintering properties and relatively high oxygen-ionic conductivity is disposed on the air-electrode side, the reaction of Equation (1) that occurs between the air electrode and the electrolyte membrane can be efficiently promoted; since an SSZ material layer having high oxygen-ionic conductivity is formed on the fuel-electrode side, the reactions of Equations (2) and (3) that occur between the electrolyte membrane and the fuel electrode can be efficiently performed; and since the second layer composed at least of a zirconia-containing material is formed, an electrolyte membrane free of gas permeability can be fabricated at a low temperature.

In a preferred embodiment of the present invention, the first layer in the electrolyte membrane is composed of an SSZ material, and the third layer is composed of a cerium-containing oxide represented by a general formula $(CeO_2)_{1-2x}(B_2O_3)_x$ (where B is any one of Sm, Gd and Y, $0.05 \leq X \leq 0.15$).

By forming an SSZ material layer on the air-electrode side of the electrolyte membrane, and forming a cerium-containing oxide represented by a general formula $(CeO_2)_{1-2x}(B_2O_3)_x$ (where B is any one of Sm, Gd and Y, $0.05 \leq X \leq 0.15$) on the fuel-electrode side of the electrolyte membrane, a solid oxide fuel cell having excellent output performance can be provided.

The reason is that since a layer composed of an SSZ material having high oxygen-ionic conductivity is formed on the air-electrode side, the reaction of Equation (1) that occurs between the air electrode and the electrolyte membrane can be efficiently promoted; since a layer composed of a cerium-containing oxide of the above-described composition having high oxygen-ionic conductivity is formed on the fuel-electrode side, the reactions of Equations (2) and (3) that occur between the electrolyte membrane and the fuel electrode can be efficiently performed; and since the second layer composed at least of a zirconia-containing material is formed, an electrolyte membrane free of gas permeability can be formed.

In a preferred embodiment of the present invention, the first layer and the third layer in the electrolyte membrane are composed of a cerium-containing oxide represented by a general formula $(CeO_2)_{1-2x}(B_2O_3)_x$ (where B is any one of Sm, Gd and Y, $0.05 \leq X \leq 0.15$).

By forming layers composed of a cerium-containing oxide represented by a general formula $(CeO_2)_{1-2x}(B_2O_3)_x$ (where B is any one of Sm, Gd and Y, $0.05 \leq X \leq 0.15$) on the air-electrode side and the fuel-electrode side of the electrolyte membrane, a solid oxide fuel cell having excellent oxygen-ionic conductivity and excellent output performance can be provided.

The reason is that since layers composed of a cerium-containing oxide of the above-described composition having high oxygen-ionic conductivity are formed on the air-electrode side and the fuel-electrode side, the reaction of Equation (1) that occurs between the air electrode and the electrolyte membrane, and the reactions of Equations (2) and (3) that occur between the electrolyte membrane and the fuel electrode can be efficiently performed; and since the second layer composed at least of a zirconia-containing material is formed, an electrolyte membrane free of gas permeability can be formed.

In a preferred embodiment of the present invention, the first layer in the electrolyte membrane is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr), and the third layer is composed of a cerium-containing oxide represented by a general formula $(CeO_2)_{1-2x}(B_2O_3)_x$ (where B is any one of Sm, Gd and Y, $0.05 \leq X \leq 0.15$).

By forming a layer composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr) on the air-electrode side, and a layer composed of a cerium-containing oxide represented by a general formula $(CeO_2)_{1-2x}(B_2O_3)_x$ (where B is any one of Sm, Gd and Y, $0.05 \leq X \leq 0.15$) on the fuel-electrode side of the electrolyte membrane, a solid oxide fuel cell having excellent oxygen-ionic conductivity and excellent output performance can be provided.

The reason is that since a layer composed of lanthanum gallate having the above-described composition is formed on the air-electrode side, the reaction of Equation (1) that occurs between the air electrode and the electrolyte membrane can be efficiently promoted; since a layer composed of a cerium-containing oxide having the above-described composition and high oxygen-ionic conductivity is formed on the fuel-electrode side, the reactions of Equations (2) and (3) that occur between the electrolyte membrane and the fuel electrode can be efficiently performed; and since the second layer composed at least of a zirconia-containing material is formed, an electrolyte membrane free of gas permeability can be formed at a low temperature.

In a preferred embodiment of the present invention, the first layer in the electrolyte membrane is composed of an ScYSZ material, and the third layer is composed of a cerium-containing oxide represented by a general formula $(CeO_2)_{1-2x}(B_2O_3)_x$ (where B is any one of Sm, Gd and Y, $0.05 \leq X \leq 0.15$).

By forming a layer composed of an ScYSZ material on the air-electrode side of the electrolyte membrane, and a layer composed of a cerium-containing oxide having the above-described composition on the fuel-electrode side, a solid oxide fuel cell having excellent output performance can be provided.

The reason is that since a layer composed of an ScYSZ material having excellent sintering properties and relatively high oxygen-ionic conductivity is formed on the air-electrode side, the reaction of Equation (1) that occurs between the air electrode and the electrolyte membrane can be efficiently promoted; since a layer composed of a cerium-containing oxide having the above-described composition and high oxygen-ionic conductivity is formed on the fuel-electrode side, the reactions of Equations (2) and (3) that occur between the electrolyte membrane and the fuel electrode can be efficiently performed; and since the first layer composed of an ScYSZ material and the second layer composed at least of a zirconia-containing material are formed, an electrolyte membrane free of gas permeability can be formed at a low temperature.

In a preferred embodiment of the present invention, the first layer is composed of an SSZ material, and the third layer is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr).

By forming a layer composed of an SSZ material on the air-electrode side, and a layer composed of lanthanum gallate having the above-described composition on the fuel-electrode side of the electrolyte membrane, a solid oxide fuel cell having excellent output performance can be provided.

The reason is that since a layer composed of an SSZ material having high oxygen-ionic conductivity is formed on the air-electrode side, the reaction of Equation (1) that occurs between the air electrode and the electrolyte membrane can be efficiently promoted; since a layer composed of lanthanum gallate having the above-described composition and high oxygen-ionic conductivity is formed on the fuel-electrode side, the reactions of Equations (2) and (3) that occur between the electrolyte membrane and the fuel electrode can be efficiently performed; and since the second layer composed at least of a zirconia-containing material are formed, an electrolyte membrane free of gas permeability can be formed at a low temperature. In addition, even if a manganese-containing oxide is used for the air electrode, deterioration of the output performance due to diffusion of the manganese can be suppressed because it can be formed at a low temperature.

In a preferred embodiment of the present invention, the first layer is composed of a cerium-containing oxide represented by a general formula $(CeO_2)_{1-2x}(B_2O_3)_x$ (where B is any one of Sm, Gd and Y, $0.05 \leq X \leq 0.15$), and the third layer is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr).

By forming a layer composed of a cerium-containing oxide of the above-described composition on the air-electrode side of the electrolyte membrane, and a layer composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr) on the fuel-electrode side, a solid oxide fuel cell having excellent output performance can be provided.

The reason is that since a layer composed of a cerium-containing oxide having the above-described composition and high oxygen-ionic conductivity is formed on the air-electrode side, the reaction of Equation (1) that occurs between the air electrode and the electrolyte membrane can be efficiently promoted; since a layer composed of lanthanum gallate having the above-described composition and high oxygen-ionic conductivity is formed on the fuel-electrode side, the reactions of Equations (2) and (3) that occur between the electrolyte membrane and the fuel electrode can be efficiently performed; and since the second layer composed at least of a zirconia-containing material is formed, an electrolyte membrane free of gas permeability can be formed at a low temperature.

In a preferred embodiment of the present invention, the first layer and the third layer are composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr).

By forming layers composed of lanthanum gallate having the above-described composition on the air-electrode side and the fuel-electrode side of the electrolyte membrane, a solid oxide fuel cell having excellent output performance can be provided.

The reason is that since layers composed of lanthanum gallate having the above-described composition and high oxygen-ionic conductivity are formed on the air-electrode side and the fuel-electrode side, the reaction of Equation (1) that occurs between the air electrode and the electrolyte membrane can be efficiently promoted; and the reactions of Equations (2) and (3) that occur between the electrolyte membrane and the fuel electrode can be efficiently performed; and since the second layer composed at least of a zirconia-containing material is formed, an electrolyte membrane free of gas permeability can be formed at a low temperature.

In a preferred embodiment of the present invention, the first layer is composed of an ScYSZ material, and the third layer is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr).

By forming a layer composed of an ScYSZ material on the air-electrode side of the electrolyte membrane, and a layer composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr) on the fuel-electrode side, a solid oxide fuel cell having excellent output performance can be provided.

The reason is that since a layer composed of an ScYSZ material having excellent sintering properties and relatively high oxygen-ionic conductivity is formed on the air-electrode side, the reaction of Equation (1) that occurs between the air electrode and the electrolyte membrane can be efficiently promoted; since a layer composed of lanthanum gallate having the above-described composition and high oxygen-ionic conductivity is formed on the fuel-electrode side, the reactions of Equations (2) and (3) that occur between the electrolyte membrane and the fuel electrode can be efficiently performed; and since the first layer composed of an ScYSZ material and the second layer composed at least of a zirconia-containing material are formed, an electrolyte membrane free of gas permeability can be formed at a low temperature.

In a preferred embodiment of the present invention, the first layer is composed of an SSZ material, and the third layer is composed of an ScYSZ material.

By forming a layer composed of an SSZ material on the air-electrode side, and a layer composed of an ScYSZ material on the fuel-electrode side of the electrolyte membrane, a solid oxide fuel cell having excellent output performance can be provided.

The reason is that since a layer composed of an SSZ material having high oxygen-ionic conductivity is formed on the air-electrode side, the reaction of Equation (1) that occurs between the air electrode and the electrolyte membrane can be efficiently promoted; and since a layer composed of an ScYSZ material is formed on the fuel-electrode side, an electrolyte membrane free of gas permeability can be formed at a low temperature.

In a preferred embodiment of the present invention, the first layer is composed of a cerium-containing oxide represented by a general formula $(CeO_2)_{1-2x}(B_2O_3)_x$ (where B is any one of Sm, Gd and Y, $0.05 \leq X \leq 0.15$), and the third layer is composed of an ScYSZ material.

By forming a layer composed of a cerium-containing oxide having the above-described composition on the air-electrode side of the electrolyte membrane, and a layer composed of an ScYSZ material on the fuel-electrode side, a solid oxide fuel cell having excellent output performance can be provided.

The reason is that since a layer composed of a cerium-containing oxide having the above-described composition is formed on the air-electrode side, the reaction of Equation (1) that occurs between the air electrode and the electrolyte membrane can be efficiently promoted; and since a layer composed of an ScYSZ material is formed on the fuel-electrode side, an electrolyte membrane free of gas permeability can be formed at a low temperature.

In a preferred embodiment of the present invention, the first layer is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr), and the third layer is composed of an ScYSZ material.

By forming a layer composed of lanthanum gallate having the above-described composition on the air-electrode side of the electrolyte membrane, and a layer composed of an ScYSZ material on the fuel-electrode side, a solid oxide fuel cell having excellent output performance can be provided.

The reason is that since a layer composed of lanthanum gallate having the above-described composition and high oxygen-ionic conductivity is formed on the air-electrode side, the reaction of Equation (1) that occurs between the air electrode and the electrolyte membrane can be efficiently promoted; and since a layer composed of an ScYSZ material having excellent sintering properties is formed on the fuel-electrode side, an electrolyte membrane free of gas permeability can be formed at a low temperature.

In a preferred embodiment of the present invention, the first layer and the third layer are composed of an ScYSZ material.

By forming layers composed of an ScYSZ material on the air-electrode side and the fuel-electrode side of the electrolyte membrane, a solid oxide fuel cell having excellent output performance can be provided.

The reason is that since the ScYSZ material excels in sintering properties, and an electrolyte membrane free of gas permeability can be formed at a low temperature, there is little deterioration of the output performance due to reaction with the electrode; and since the oxygen-ionic conductivity of the ScYSZ material is relatively high, the reaction of Equation (1) that occurs between the air electrode and the electrolyte membrane, and the reactions of Equations (2) and (3) that occur between the electrolyte membrane and the fuel electrode can be efficiently promoted.

In a preferred embodiment of the present invention, the doped amount of scandia in SSZ is 3 to 12 mol %.

By making the amount of scandia 3 to 12 mol %, the reactions of Equation (1) and/or Equations (2) and (3) can be efficiently promoted, and a solid oxide fuel cell having excellent output performance can be provided.

The reason is that if the amount of scandia is less than 3 mol %, the oxygen-ionic conductivity of the material is lowered, and the output performance is deteriorated. On the other hand, if the amount is larger than 12 mol %, rhombohederal crystals are formed in addition to cubic crystals in the crystal phase, and the oxygen-ionic conductivity is lowered.

In a preferred embodiment of the present invention, the SSZ material is further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

According to the present invention, by doping with at least one oxide of 5 mol % or less which is selected from a group consisting of $CeO_2$, $Sm_2O_3$, $Gd_2O_3$, $Yb_2O_3$, $Er_2O_3$ and $Bi_2O_3$, a solid oxide fuel cell having excellent output performance can be provided.

The reason why it is preferable to contain such an oxide of 5 mol % or less is at least one of high oxygen-ionic conductivity and improved sintering properties of the material. More specifically, if the oxygen-ionic conductivity is high, the output performance is improved; and if the sintering properties are improved, an electrolyte membrane free of gas permeability can be formed at a low temperature. It is also preferable to dope with two or more oxides because there is a possibility that both effects of oxygen-ionic conductivity and gas permeability can be obtained. On the other hand, if an oxide of more than 5 mol % oxide is contained, there is a possibility that rhombohederal crystals are formed in addition to cubic crystals in the crystal phase, and the oxygen-ionic conductivity is lowered.

In a preferred embodiment of the present invention, the total amount of scandia and yttria in the zirconia material doped with at least scandia and yttria is 3 to 12 mol %.

According to the present invention, by making the total amount of scandia and yttria 3 to 12 mol %, a solid oxide fuel cell having excellent output performance can be provided.

The reason is that if the total amount of scandia and yttria is within the range of less than 3 mol %, the oxygen-ionic conductivity of the material is lowered, and output performance is deteriorated. On the other hand, if the total amount is larger than 12 mol %, there is a possibility that rhombohederal crystals are formed in addition to cubic crystals in the crystal phase, and the oxygen-ionic conductivity is lowered.

The zirconia material doped with at least scandia and yttria can be zirconia doped with at least two kinds of oxides, i.e., scandia and yttria, and can contain other components. For example, a zirconia material doped with scandia, yttria and ceria or the like is possible.

In a preferred embodiment of the present invention, the ScYSZ material is further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

According to the present invention, by doping with at least one oxide of 5 mol % or less which is selected from a group consisting of $CeO_2$, $Sm_2O_3$, $Gd_2O_3$, $Yb_2O_3$, $Er_2O_3$ and $Bi_2O_3$ in the ScYSZ material, a solid oxide fuel cell having excellent output performance can be provided.

The reason why it is preferable to contain such an oxide of 5 mol % or less is at least one of high oxygen-ionic conductivity and improved sintering properties of the material. More specifically, if the oxygen-ionic conductivity is high, the output performance is improved; and if the sintering properties are improved, an electrolyte membrane free of gas permeability can be formed at a low temperature. It is also preferable to dope with two or more oxides because there is a possibility that both effects of oxygen-ionic conductivity and gas permeability can be obtained. On the other hand, if an oxide of more than 5 mol % is contained, there is a possibility that rhombohederal crystals are formed in addition to cubic crystals in the crystal phase, and the oxygen-ionic conductivity is lowered.

In a preferred embodiment of the present invention, the doped amount of yttria in YSZ material is 3 to 12 mol %.

By making the amount of yttria within the above-described range, an electrolyte membrane free of gas permeability can be easily fabricated, and a solid oxide fuel cell having excellent output performance can be provided.

The reason why the amount of yttria is limited to 3 to 12 mol % is that if the amount of yttria is less than 3 mol %, the oxygen-ionic conductivity of the material is low, and the stability of the crystal phase is deteriorated; on the other hand, if the amount is larger than 12 mol %, rhombohedral crystals are formed in addition to cubic crystals in the crystal phase, and the oxygen-ionic conductivity is lowered.

In a preferred embodiment of the present invention, an air-electrode-side reaction layer having open pores is interposed between the electrolyte membrane and the air electrode so as to accelerate the reaction of forming oxygen ion from oxygen gas and electron.

By forming the layer having open pores between the electrolyte membrane and the air electrode so as to accelerate the reaction of forming oxygen ion, a solid oxide fuel cell having excellent output performance can be provided.

The reason is that since oxygen ion is formed in a fine structure in which oxygen gas can easily enter, the reaction of Equation (1) is accelerated, and oxygen ion can be efficiently supplied to the electrolyte membrane.

In a preferred embodiment of the present invention, the air-electrode-side reaction layer is composed of a layer in which lanthanum manganite represented by a general formula $(La_{1-x}A_x)_yMnO_3$ (where A is either Ca or Sr) and scandia-doped zirconia are evenly mixed (hereafter referred to as $LaAMnO_3/SSZ$).

According to the present invention, by forming the air-electrode-side reaction layer composed of $LaAMnO_3/SSZ$ between the air electrode and the electrolyte membrane, a solid oxide fuel cell having excellent output performance can be provided even at a power generating temperature of about 700° C.

The reason is that since $LaAMnO_3/SSZ$ has high electronic conductivity and oxygen-ionic conductivity even at a low temperature of about 700° C., the reaction of Equation (1) taking place between the air electrode and the electrolyte membrane can be efficiently promoted; and since the oxygen-ionic conductivity of the material of the electrolyte membrane on the air-electrode side is high, oxygen ion can be efficiently supplied to the fuel-electrode side, and high output performance can be obtained even at a low temperature of about 700° C.

The layer in which lanthanum manganite represented by a general formula $(La_{1-x}A_x)_yMnO_3$ (where A is either Ca or Sr) and SSZ are evenly mixed can be obtained using a material prepared by a liquid-phase method such as a co-precipitation method. The word "evenly" refers to evenness of the level of a material obtained using a co-precipitation method.

In a preferred embodiment of the present invention, the air electrode is composed of lanthanum manganite represented by a general formula $(La_{1-x}A_x)_yMnO_3$ (where A is either Ca or Sr) (hereafter referred to as $LaAMnO_3$).

According to the present invention, by employing the composition of the air electrode as mentioned above, a solid oxide fuel cell having excellent output performance can be provided.

The reason is that the composition has high electronic conductivity in the air atmosphere of a solid oxide fuel cell, and is stable as a material.

In a preferred embodiment of the present invention, a fuel-electrode-side reaction layer having open pores is interposed between the electrolyte membrane and the fuel electrode so as to accelerate the reaction of forming $H_2O$ and/or $CO_2$, and electron from at least hydrogen gas ($H_2$) and/or carbon monoxide gas (CO) contained in the fuel gas, and oxygen ion ($O_2^-$).

By forming such a layer to accelerate the reactions of Equations (2) and (3) between the electrolyte membrane and the fuel electrode as a fine structure in which hydrogen gas ($H_2$) and/or carbon monoxide gas (CO) can easily enter, a solid oxide fuel cell having excellent output performance can be provided.

The reason is that oxygen ion moving through the electrolyte membrane can be efficiently converted to $H_2O$ and/or $CO_2$, and electron.

In a preferred embodiment of the present invention, the fuel-electrode-side reaction layer is composed of a layer in which NiO and scandia-doped zirconia are evenly mixed (hereafter referred to as NiO/SSZ), or Ni and scandia-doped zirconia are evenly mixed (hereafter referred to as Ni/SSZ).

According to the present invention, by forming the fuel-electrode-side reaction layer composed of NiO/SSZ or Ni/SSZ between the fuel electrode and the electrolyte membrane, a solid oxide fuel cell having excellent output performance can be provided even at a power generating temperature of about 700° C.

The reason is that since NiO/SSZ or Ni/SSZ has high electronic conductivity and oxygen-ionic conductivity even at a low temperature of about 700° C., the reactions of Equations (2) and (3) taking place between the electrolyte membrane and the fuel electrode can be efficiently promoted; and since the oxygen-ionic conductivity of the material of the electrolyte membrane on the fuel-electrode side is high, oxygen ion can be efficiently supplied to the fuel-electrode side, and high output performance can be obtained even at a low temperature of about 700° C.

NiO described herein is reduced into Ni in the fuel-gas atmosphere, and the layer becomes an Ni/SSZ layer.

The layer in which Ni and scandia-doped zirconia are evenly mixed can be obtained using a material prepared by a liquid-phase method such as a co-precipitation method. The word "evenly" refers to evenness of the level of a material obtained using a co-precipitation method.

In a preferred embodiment of the present invention, the fuel electrode is composed of a layer in which NiO and yttria-doped zirconia are evenly mixed (hereafter referred to as NiO/YSZ), or a layer in which Ni and yttria-doped zirconia are evenly mixed (hereafter referred to as Ni/YSZ).

According to the present invention, by using the above-described layer as the fuel electrode, a solid oxide fuel cell having excellent output performance can be provided.

The reason is that such a layer has high electronic conductivity in the fuel-gas atmosphere, excels in durability, and is stable.

NiO described herein is reduced into Ni in the fuel-gas atmosphere, and the layer becomes an Ni/YSZ layer.

In a preferred embodiment of the present invention, the interconnector is composed of Ca-doped lanthanum chromite.

By adopting Ca-doped lanthanum chromite, a membrane free of gas permeability can be easily fabricated, and an interconnector having high electronic conductivity can be fabricated.

The reason is that lanthanum chromite doped with an element other than Ca requires firing at a temperature higher than 1500° C. for fabricating a membrane free of gas permeability, and if the solid oxide fuel cell is fired at this temperature, reactions take place between other constituting materials, and the output performance is deteriorated.

A membrane free of gas permeability described herein is evaluated by gas permeation amount of the gas permeated between a side of the interconnector and the opposite side thereof when pressure difference is created between them, and the gas permeation amount (O) is represented by $Q \leq 2.8 \times 10^{-9}\ ms^{-1}Pa^{-1}$ (more preferably $Q \leq 2.8 \times 10^{-10}\ ms^{-1}Pa^{-1}$).

In a preferred embodiment of the present invention, the electrolyte membrane is formed on a surface of the air-electrode-side reaction layer, and then sintered at 1350 to 1500° C.

By sintering the electrolyte membrane formed on a surface of the air-electrode-side reaction layer at 1350 to 1550° C., the reaction of Equation (1) taking place between the air electrode and the electrolyte membrane can be efficiently promoted, and an electrolyte membrane free of gas permeability can be formed.

The reason is that the sintering temperature below 1350° C. is too low to form the electrolyte membrane free of gas permeability; on the other hand, the sintering temperature above 1500° C. raises the reactivity with the air-electrode-side reaction layer, and deteriorates output performance.

In a preferred embodiment of the present invention, the electrolyte membrane is formed on a surface of the fuel-electrode-side reaction layer, and then sintered at 1350 to 1500° C.

By sintering the electrolyte membrane formed on a surface of the fuel-electrode-side reaction layer at 1350 to 1500° C., the reactions of Equations (2) and (3) taking place between the electrolyte membrane and the fuel electrode can be efficiently promoted, and an electrolyte membrane free of gas permeability can be formed.

The reason is that the sintering temperature below 1350° C. is too low to form the electrolyte membrane free of gas permeability; on the other hand, the sintering temperature above 1500° C. raises the reactivity with the fuel electrode or the fuel-electrode-side reaction layer, and deteriorates output performance.

EFFECT OF THE INVENTION

Since the present invention provides a solid oxide fuel cell comprising a single cell having an air electrode disposed on a surface of an electrolyte membrane and a fuel electrode disposed on the other surface of the electrolyte membrane, and an interconnector having a role of electrical connection; wherein the electrolyte membrane is provided with a first layer composed of a material having an oxygen-ionic conductivity of S1 on the air-electrode side, a third layer composed of a material having an oxygen-ionic conductivity of S3 on the fuel-electrode side, and a second layer composed of a material containing at least zirconia and having an oxygen-ionic conductivity of S2 between the first layer and the third layer; the oxygen-ionic conductivity of S1 and the oxygen-ionic conductivity of S2 have a relationship of S1>S2, and the oxygen-ionic conductivity of S3 and the oxygen-ionic conductivity of S2 have a relationship of S3>S2, a solid oxide fuel cell having excellent output performance can be provided.

DETAILED DESCRIPTION OF THE PREFERRED EMBODIMENTS

A solid oxide fuel cell according to the present invention will be described referring to FIG. 1.

Figure 1:
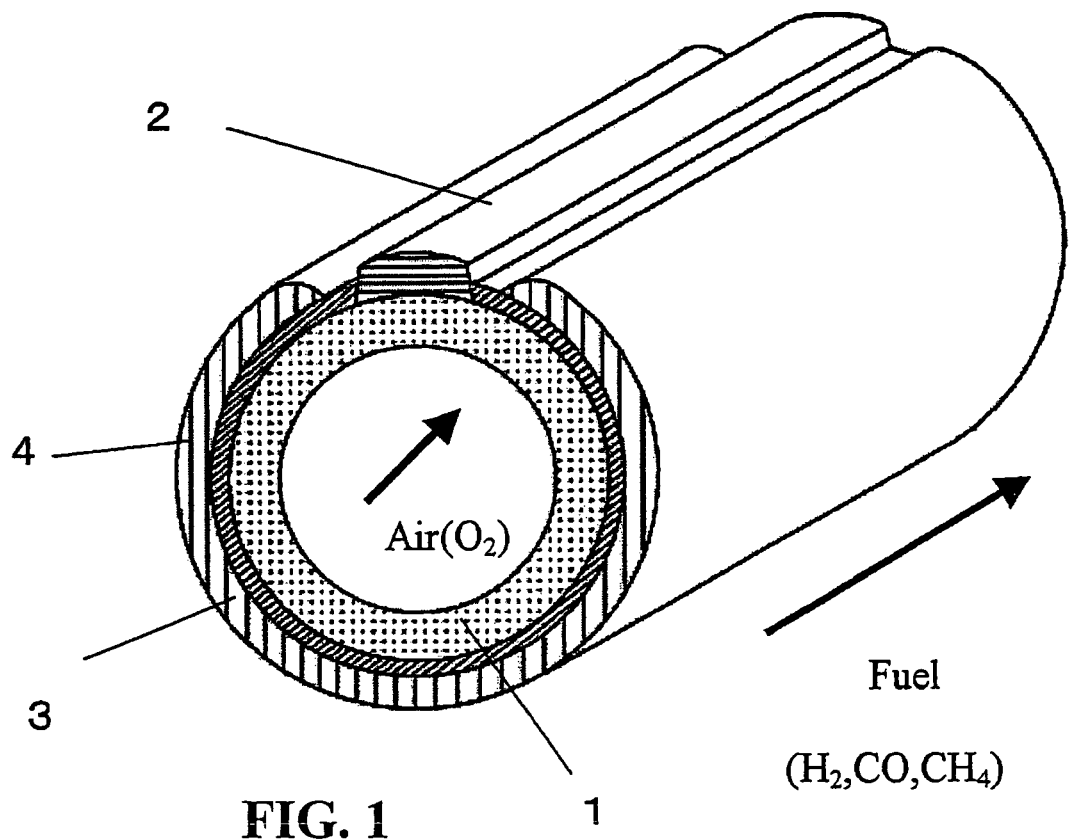
FIG. 1 is a view showing a section of a cylindrical solid oxide fuel cell.

FIG. 1 is a view showing a section of a solid oxide fuel cell of a cylindrical type. A strip-shaped interconnector 2 and an electrolyte membrane 3 are formed on a cylindrical air-electrode support 1; and a fuel electrode 4 is formed on the electrolyte membrane 3 so as not to contact the interconnector 2. When air is flowed through the inside of the air-electrode support 1, and a fuel gas is flowed through the outside, oxygen gas in the air is converted into oxygen ion at the boundary between the air electrode and the electrolyte membrane, and the oxygen ion pass through the electrolyte membrane and reach the fuel electrode. The fuel gas reacts with the oxygen ion to form water and carbon dioxide. These reactions are shown in Equations (2) and (3). By connecting the fuel electrode 4 with the interconnector 2, electricity can be taken out.

$$H_2 + O^{2-} \rightarrow H_2O + 2e^- \qquad (2)$$

$$CO + O^{2-} \rightarrow CO_2 + 2e^- \qquad (3)$$

Figure 2:
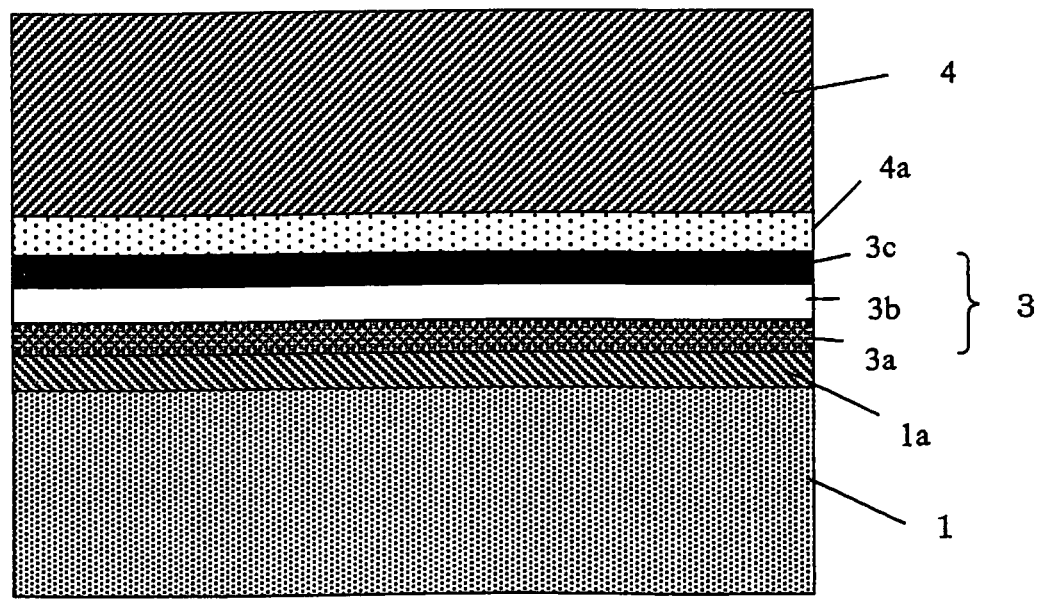
FIG. 2 is a sectional view showing the structure of the air electrode, the electrolyte membrane and the fuel electrode of the solid oxide fuel cell of FIG. 1.

FIG. 2 is a sectional view showing the solid oxide fuel cell in which an air-electrode-side electrode reaction layer 1a is formed between the air electrode 1 and the electrolyte membrane 3, a fuel-electrode-side reaction layer 4a is formed between the electrolyte membrane 3 and the fuel electrode 4, and the electrolyte membrane 3 consists of or is composed of three layers, i.e., a first layer 3a, a second layer 3b and a third layer 3c in this order from the air electrode side toward the fuel electrode side.

Figure 3:
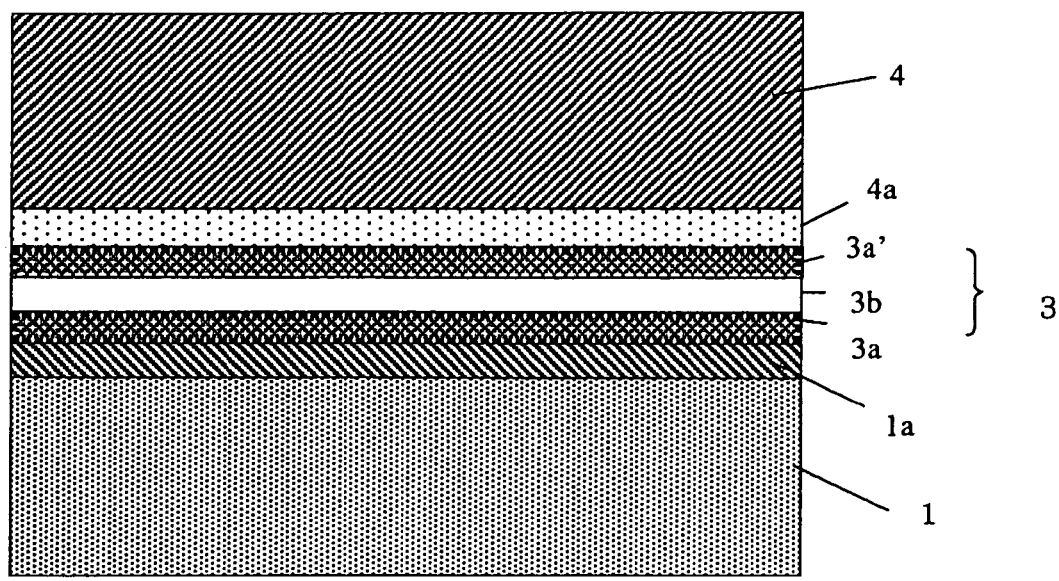
FIG. 3 is a sectional view showing the structure of the air electrode, the electrolyte membrane and the fuel electrode of the solid oxide fuel cell of FIG. 1.

FIG. 3 is a sectional view showing the solid oxide fuel cell in which the electrolyte membrane 3 is consisted of three layers, i.e., a first layer 3a, a second layer 3b and a third layer 3a' in this order from the air electrode side toward the fuel electrode side, and the first layer 3a and the third layer 3a' has the same composition.

The details of electric power generation will be described referring to FIG. 2. The air-electrode-side reaction layer 1a is formed to accelerate the reaction of Equation (1) in which oxygen ion is formed from oxygen gas of the air electrode and electron, and the oxygen ion formed in the electrode reaction layer 1a pass through the electrolyte membranes 3a, 3b and 3c to the fuel-electrode side. Then, the reactions of Equations (2) and (3) take place in the fuel-electrode-side-reaction layer 4a, and by connecting the fuel electrode 4 to the interconnector 2, electricity can be taken out. Therefore, if the air-electrode-side reaction layer, the electrolyte membrane and the fuel-electrode-side reaction layer are optimized, a solid oxide fuel cell having excellent output performance even at a temperature as low as about 700° C. can be provided.

$$\tfrac{1}{2}O_2 + 2e^- \rightarrow O^{2-} \qquad (1)$$

It is preferable that the electrolyte membrane according to the present invention has high oxygen-ionic conductivity in the air atmosphere and the fuel-gas atmosphere at the power generating temperature of the solid oxide fuel cell, is free of gas permeability, and has no electronic conductivity. Particularly, in order to efficiently promote the reaction of Equation (1) and the reactions of Equations (2) and (3), it is preferable that a material having high oxygen-ionic conductivity is provided on the air-electrode side and the fuel-electrode side.

Materials having high oxygen-ionic conductivity that have been developed to date such as SSZ and lanthanum gallate have problems that the cost is high or the sintering properties are low. Therefore, in terms of the practicality of a solid oxide fuel cell, it is preferable to laminate materials having a low cost, high sintering properties, and a certain degree of oxygen-ionic conductivity. Specifically, in the electrolyte membrane of the present invention, a first layer composed of a material having high oxygen-ionic conductivity on the air-electrode side, a third layer composed of a material having high oxygen-ionic conductivity on the fuel-electrode side, and a second layer composed of a material containing at least zirconia having excellent sintering properties between the first layer and third layer are laminated.

As the first layer and third layer in the electrolyte membrane of the present invention, a material having high oxygen-ionic conductivity is preferred. From this point of view, the examples of the material for the first layer and the third layer include SSZ, cerium-containing oxides, a mixed layer of SSZ and a cerium-containing oxide, and lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr). ScYSZ and SSZ doped with $CeO_2$, $Bi_2O_3$ or the like may be used.

The cerium-containing oxide is not limited as far as the oxides contain cerium; however, from the point of view of high oxygen-ionic conductivity, the cerium-containing oxide represented by a general formula $(CeO_2)_{1-2x}(B_2O_3)_x$ (where B is any one of Sm, Gd and Y, and $0.05 \leq X \leq 0.15$) are preferred.

The material having high oxygen-ionic conductivity is preferably a material having oxygen-ionic conductivity of 0.1 $Scm^{-1}$ or more at 1000° C., and more preferably 0.02 $Scm^{-1}$ or more even at 700° C. The reason is that if a material having oxygen-ionic conductivity of 0.1 $Scm^{-1}$ or more at 1000° C. is adopted for the electrolyte membrane, it is possible to provide a solid oxide fuel cell having high output performance at 900 to 1000° C., and if a material has an oxygen-ionic conductivity of 0.025 $Scm^{-1}$ or more at 700° C., it may be possible to provide a solid oxide fuel cell having high output performance at a low temperature of 700° C.

A method for measuring oxygen-ionic conductivity will be described. After mixing a binder such as PVA with the material for the electrolyte membrane and press-forming the mixture in a disc-shaped mold, sintering was performed to prepare a sample free of gas permeability. After a platinum electrode was fixed on the sample, the temperature was elevated to 1000° C., and the oxygen-ionic conductivity of the sample was measured using an AC impedance measuring method. Furthermore, the oxygen-ionic conductivity of the sample was also measured in the same manner at 700° C.

The data of 1000° C. and 700° C. are shown hereinafter. The oxygen-ionic conductivities S1, S2 and S3 in the present invention are S1>S2 and S2<S3 when those at 1000° C. are compared. An example of the results of the oxygen-ionic conductivities measured using the above method is shown in Table 1.

TABLE 1

| General name | Composition | Oxygen ion conductivity/$Scm^{-1}$ 1000° C. | 700° C. |
|---|---|---|---|
| SSZ | 90 mol % $ZrO_2$-10 mol % $Sc_2O_3$ | 0.35 | 0.065 |
| | 89 mol % $ZrO_2$-10 mol % $Sc_2O_3$-1 mol $CeO_2$ | 0.39 | 0.075 |
| | 88 mol % $ZrO_2$-10 mol % $Sc_2O_3$-2 mol $CeO_2$ | 0.38 | 0.073 |
| | 85 mol % $ZrO_2$ 10 mol % $Sc_2O_3$ 5 mol $CeO_2$ | 0.32 | 0.057 |
| | 89 mol % $ZrO_2$-10 mol % $Sc_2O_3$-1 mol $Sm_2O_3$ | 0.33 | 0.057 |
| | 89 mol % $ZrO_2$-10 mol % $Sc_2O_3$-1 mol $Er_2O_3$ | 0.34 | 0.060 |
| | 89 mol % $ZrO_2$-10 mol % $Sc_2O_3$-1 mol $Bi_2O_3$ | 0.38 | 0.072 |
| | 88 mol % $ZrO_2$-10 mol % $Sc_2O_3$-2 mol $Bi_2O_3$ | 0.36 | 0.065 |
| | 89 mol % $ZrO_2$-10 mol % $Sc_2O_3$-0.5 mol $Bi_2O_3$-0.5 mol $CeO_2$ | 0.36 | 0.067 |
| | 89 mol % $ZrO_2$-10 mol % $Sc_2O_3$-0.5 mol $Bi_2O_3$-0.25 mol $Y_2O_3$-0.25 mol $CeO_2$ | 0.36 | 0.065 |
| | 89 mol % $ZrO_2$-10 mol % $Sc_2O_3$-0.5 mol $Bi_2O_3$-0.5 mol $Y_2O_3$ | 0.34 | 0.062 |
| | 96 mol % $ZrO_2$-4 mol % $Sc_2O_3$ | 0.12 | 0.022 |
| ScYSZ | 90 mol % $ZrO_2$-8 mol % $Sc_2O_3$-2 mol % $Y_2O_3$ | 0.31 | 0.054 |
| | 89 mol % $ZrO_2$ 10 mol % $Sc_2O_3$ 1 mol $Y_2O_3$ | 0.35 | 0.065 |
| | 89 mol % $ZrO_2$-8 mol % $Sc_2O_3$-2 mol % $Y_2O_3$-1 mol $CeO_2$ | 0.34 | 0.062 |
| | 90 mol % $ZrO_2$-5 mol % $Sc_2O_3$-5 mol % $Y_2O_3$ | 0.23 | 0.040 |
| SSZ/YSZ | 90 mol % $ZrO_2$-10 mol % $Sc_2O_3$/ 90 mol % $ZrO_2$-10 mol % $Y_2O_3$ = 80/20 | 0.30 | 0.053 |
| | 90 mol % $ZrO_2$-10 mol % $Sc_2O_3$/ 90 mol % $ZrO_2$-10 mol % $Y_2O_3$ = 50/50 | 0.23 | 0.040 |
| YSZ | 92 mol % $ZrO_2$-8 mol % $Y_2O_3$ | 0.17 | 0.019 |
| | 90 mol % $ZrO_2$ 10 mol % $Y_2O_3$ | 0.14 | 0.014 |
| | 88 mol % $ZrO_2$-12 mol % $Y_2O_3$ | 0.11 | 0.009 |
| | 97 mol % $ZrO_2$-3 mol % $Y_2O_3$ | 0.06 | 0.003 |
| Cerium oxides | $(CeO_2)_{0.9}(Gd_2O_3)_{0.05}$ | 0.35 | 0.071 |
| | $(CeO_2)_{0.8}(Gd_2O_3)_{0.1}$ | 0.36 | 0.072 |
| | $(CeO_2)_{0.7}(Gd_2O_3)_{0.15}$ | 0.32 | 0.060 |
| | $(CeO_2)_{0.8}(Sm_2O_3)_{0.1}$ | 0.35 | 0.070 |
| | $(CeO_2)_{0.8}(Y_2O_3)_{0.1}$ | 0.26 | 0.045 |
| Lanthanum gallate | $La_{0.8}Sr_{0.8}Ga_{0.8}Mg_{0.115}Co_{0.085}O_3$ | 0.59 | 0.139 |
| | $La_{0.8}Sr_{0.2}Ga_{0.8}Mg_{0.2}O_3$ | 0.45 | 0.100 |

As the second layer in the electrolyte membrane of the present invention, the material having the sintering properties for easily fabricating the electrolyte membrane free of gas permeability, and a certain degree of oxygen-ionic conductivity is preferred. From this point of view, YSZ, SSZ further doped with $Bi_2O_3$ or a rare-earth oxide, or the like is preferred. ScYSZ can also be used.

The second layer in the electrolyte membrane of the present invention is not specifically limited as far as it is composed of a material having a certain degree of oxygen-ionic conductivity (e.g., 0.01 Scm$^{-1}$ or more at 1000° C.) and containing at least zirconia. Zirconia doped with rare-earth oxide other than yttria and scandia can also be used. However, in order to obtain more excellent performance than the case of an electrolyte membrane composed of a material having high oxygen-ionic conductivity alone, a material having excellent sintering properties is more preferable. The reason is that if a material having excellent sintering properties is used, an electrolyte membrane free of gas permeability can be sintered at a low temperature. For example, when LaAMnO$_3$ is used as the material of the air electrode, diffusion of the manganese into the electrolyte membrane can be suppressed, and deterioration of the output performance can be prevented.

The combination of the first, second, and third layers in the electrolyte membrane of the present invention is not specifically limited as far as the oxygen-ionic conductivity of the first layer and the third layer is higher than that of the second layer. Referring to the data of Table 1, examples of the combination of the first, second and third layers can be shown as Table 2.

TABLE 2

| Combination example | First layer | Second layer | Third layer |
|---|---|---|---|
| 1 | 90 mol % ZrO$_2$-<br>10 mol % Sc$_2$O$_3$ | 90 mol % ZrO$_2$-<br>10 mol % Y$_2$O$_3$ | 89 mol % ZrO$_2$-<br>10 mol % Sc$_2$O$_3$-<br>1 mol % CeO$_2$ |
| 2 | 90 mol % ZrO$_2$-<br>5 mol % Sc$_2$O$_3$-<br>5 mol % Y$_2$O$_3$ | 90 mol % ZrO$_2$-<br>10 mol % Y$_2$O$_3$ | 89 mol % ZrO$_2$-<br>10 mol % Sc$_2$O$_3$-<br>1 mol % CeO$_2$ |
| 3 | La$_{0.8}$Sr$_{0.2}$Ga$_{0.8}$Mg$_{0.2}$O$_3$ | 90 mol % ZrO$_2$-<br>10 mol % Y$_2$O$_3$ | 89 mol % ZrO$_2$-<br>10 mol % Sc$_2$O$_3$-<br>1 mol % CeO$_2$ |
| 4 | (CeO$_2$)$_{0.8}$(Gd$_2$O$_3$)$_{0.1}$ | 90 mol % ZrO$_2$-<br>10 mol % Y$_2$O$_3$ | 89 mol % ZrO$_2$-<br>10 mol % Sc$_2$O$_3$-<br>1 mol % CeO$_2$ |
| 5 | 90 mol % ZrO$_2$-<br>10 mol % Sc$_2$O$_3$ | 90 mol % ZrO$_2$-<br>5 mol % Sc$_2$O$_3$-<br>5 mol % Y$_2$O$_3$ | 90 mol % ZrO$_2$-<br>10 mol % Sc$_2$O$_3$. |
| 6 | 89 mol % ZrO$_2$-<br>10 mol % Sc$_2$O$_3$-<br>1 mol % CeO$_2$ | 90 mol % ZrO$_2$-<br>5 mol % Sc$_2$O$_3$-<br>5 mol % Y$_2$O$_3$ | (CeO$_2$)$_{0.8}$(Gd$_2$O$_3$)$_{0.1}$ |
| 7 | (CeO$_2$)$_{0.8}$(Y$_2$O$_3$)$_{0.1}$ | 90 mol % ZrO$_2$-<br>5 mol % Sc$_2$O$_3$-<br>5 mol % Y$_2$O$_3$ | (CeO$_2$)$_{0.8}$(Gd$_2$O$_3$)$_{0.1}$ |
| 8 | La$_{0.8}$Sr$_{0.2}$Ga$_{0.8}$Mg$_{0.2}$O$_3$ | 90 mol % ZrO$_2$-<br>5 mol % Sc$_2$O$_3$-<br>5 mol % Y$_2$O$_3$ | (CeO$_2$)$_{0.8}$(Gd$_2$O$_3$)$_{0.1}$ |
| 9 | 90 mol % ZrO$_2$-<br>8 mol % Sc$_2$O$_3$-<br>2 mol % Y$_2$O$_3$ | 90 mol % ZrO$_2$-<br>5 mol % Sc$_2$O$_3$-<br>5 mol % Y$_2$O$_3$ | (CeO$_2$)$_{0.8}$(Gd$_2$O$_3$)$_{0.1}$ |
| 10 | 89 mol % ZrO$_2$-<br>10 mol % Sc$_2$O$_3$-<br>1 mol % CeO$_2$ | 90 mol % ZrO$_2$-<br>10 mol % Y$_2$O$_3$ | La$_{0.8}$Sr$_{0.2}$Ga$_{0.8}$Mg$_{0.2}$O$_3$ |
| 11 | (CeO$_2$)$_{0.9}$(Gd$_2$O$_3$)$_{0.1}$ | 90 mol % ZrO$_2$-<br>10 mol % Y$_2$O$_3$ | La$_{0.8}$Sr$_{0.2}$Ga$_{0.8}$Mg$_{0.2}$O$_3$ |
| 12 | La$_{0.8}$Sr$_{0.2}$Ga$_{0.8}$Mg$_{0.2}$O$_3$ | 90 mol % ZrO$_2$-<br>10 mol % Y$_2$O$_3$, | La$_{0.8}$Sr$_{0.2}$Ga$_{0.8}$Mg$_{0.2}$O$_3$ |
| 13 | 90 mol % ZrO$_2$-<br>8 mol % Sc$_2$O$_3$-<br>2 mol % Y$_2$O$_3$ | 90 mol % ZrO$_2$-<br>10 mol % Y$_2$O$_3$ | La$_{0.8}$Sr$_{0.2}$Ga$_{0.8}$Mg$_{0.2}$O$_3$ |
| 14 | 90 mol % ZrO$_2$-<br>10 mol % Sc$_2$O$_3$ | 90 mol % ZrO$_2$-<br>5 mol % Sc$_2$O$_3$-<br>5 mol % Y$_2$O$_3$ | 90 mol % ZrO$_2$-<br>8 mol % Sc$_2$O$_3$-<br>2 mol % Y$_2$O$_3$ |
| 15 | (CeO$_2$)$_{0.8}$(Gd$_2$O$_3$)$_{0.1}$ | 90 mol % ZrO$_2$-<br>5 mol % Sc$_2$O$_3$-<br>5 mol % Y$_2$O$_3$ | 90 mol % ZrO$_2$-<br>8 mol % Sc$_2$O$_3$-<br>2 mol % Y$_2$O$_3$ |
| 16 | La$_{0.8}$Sr$_{0.2}$Ga$_{0.8}$Mg$_{0.2}$O$_3$ | 90 mol % ZrO$_2$-<br>5 mol % Sc$_2$O$_3$-<br>5 mol % Y$_2$O$_3$ | 90 mol % ZrO$_2$-<br>8 mol % Sc$_2$O$_3$-<br>2 mol % Y$_2$O$_3$ |
| 17 | 90 mol % ZrO$_2$-<br>8 mol % Sc$_2$O$_3$-<br>2 mol % Y$_2$O$_3$ | 90 mol % ZrO$_2$-<br>5 mol % Sc$_2$O$_3$-<br>5 mol % Y$_2$O$_3$ | 90 mol % ZrO$_2$-<br>8 mol % Sc$_2$O$_3$-<br>2 mol % Y$_2$O$_3$ |

The first layer and the third layer in the electrolyte membrane of the present invention may be composed of a material having higher oxygen-ionic conductivity than the second layer, and may be of the same composition. For example, Nos. 12 and 17 in Table 2 can be used.

It is preferable that the material powder of the electrolyte membrane of the present invention can form a membrane free of gas permeability. More preferably, the material powder is controlled to have a BET value of 0.5 to 20 m$^2$g$^{-1}$, a 3% diameter of 0.1 μm or more, a 97% diameter of 2 μm or less, and an average particle diameter of about 0.3 to 1 μm. If the material powder controlled to be within the above ranges is used, even a combination of the electrolyte materials having low sintering properties can form an electrolyte membrane free of gas permeability.

The BET value is a value measured using a Micromeritics FlowSorb II 2300 manufactured by Shimadzu Corporation. The particle-size distribution is a value measured using a Laser Diffraction Particle Size Analyzer SALD-2000 manufactured by Shimadzu Corporation. The particle-size distribution is the value measured using a Laser Diffraction Particle Size Analyzer SALD-2000 manufactured by Shimadzu Corporation. In addition, the average particle diameter is a median diameter (50% diameter) value measured using a Laser Diffraction Particle Size Analyzer SALD-2000 manufactured by Shimadzu Corporation.

Although the method for forming an electrolyte membrane in the present invention is not specifically limited, a slurry coating method, a screen printing method and a sheet adhering method are preferred from the point of view of high mass productivity and low costs.

The method for preparing the material of the electrolyte membrane in the present invention is not specifically limited. A co-precipitation method is generally used.

It is preferable that the air electrode in the present invention has high electronic conductivity and high oxygen-gas permeability, and can efficiently perform the reaction of Equation (1) in the air atmosphere of the solid oxide fuel cell. Preferable materials from this point of view include LaAMnO$_3$.

In order to efficiently perform the reaction of Equation (1) and improve the output performance, it is preferable to interpose an air-electrode-side reaction layer between the air electrode and the electrolyte membrane.

Since the air-electrode-side reaction layer is formed to efficiently perform the reaction of Equation (1) and improve the output performance, it is preferable to have high oxygen-ionic conductivity. It is more preferable that the air-electrode-side reaction layer further has electronic conductivity, so that the reaction of Equation (1) can be more promoted. Furthermore, it is preferable that the air-electrode-side reaction layer is composed of a material having a coefficient of thermal expansion close to that of the material of the electrolyte membrane, low reactivity with the electrolyte membrane and the air electrode, and high adhesiveness. If the material fulfills all of these characteristics, high output characteristics can be obtained even at a low temperature of about 700° C. From such a point of view, the preferable materials include LaAMnO$_3$/SSZ.

In the present invention, when the composition of lanthanum manganite represented by LaAMnO$_3$ (A is either Ca or Sr) in the LaAMnO$_3$/SSZ of the air-electrode-side reaction layer is described as (La$_{1-x}$A$_x$)$_y$MnO$_3$, it is preferable that the values of x and y are within the ranges of 0.15≦x≦0.3 and 0.97≦y≦1 from electronic conductivity at 700° C. or above, the stability of the material, and the like.

The reason is that the electronic conductivity lowers in a case of x<0.15 or x>0.3, the reactivity rises and the activity of the electrode reaction layer lowers in a case of y<0.97, and the output performance of the cell lowers because reaction with zirconia forms an insulation layer represented by La$_2$Zr$_2$O$_7$ in a case of y>1.

The SSZ of the air-electrode-side reaction layer in the present invention may be further doped with an oxide of 5 mol % or less which is any one or more of: CeO$_2$, Sm$_2$O$_3$, Gd$_2$O$_3$, Bi$_2$O$_3$ and Y$_2$O$_3$. It is preferable to contain these materials because improvement of the oxygen-ionic conductivity and/or the sintering properties can be expected.

In order to increase the electrode activity of the air-electrode-side reaction layer composed of LaAMnO$_3$/SSZ according to the present invention, a structure where the average particle diameter or the BET value of the material powder has a gradient can be used. For example, a structure where the average particle diameter is varied to 5 μm, 3 μm and 1 μm, or the BET value is varied to 1 m$^2$g$^{-1}$, 3 m$^2$g$^{-1}$, and 5 m$^2$g$^{-1}$ from the air-electrode side toward the electrolyte membrane can be used. In order to efficiently perform the reaction of Equation (1), it is preferable to make a gradient in average particle diameter and the BET value.

In order to increase the electrode activity of the air-electrode-side reaction layer composed of LaAMnO$_3$/SSZ according to the present invention, a structure where the composition has a gradient can be used. For example, a structure where the ratio of LaAMnO$_3$/SSZ is varied to 80/20, 50/50 and 20/80 from the air-electrode side toward the electrolyte membrane can be used. In order to reduce the difference of the thermal expansion between the air-electrode and the electrolyte membrane and efficiently perform the reaction of Equation (1), it is preferable to make a gradient in the composition.

LaAMnO$_3$ of the air-electrode-side reaction layer composed of LaAMnO$_3$/SSZ in the present invention may be doped with Ce, Sm, Pr, Nd, Co, Al, Fe, Ni or Cr to improve the electronic conductivity and prevent the Mn component from diffusing into the electrolyte membrane. Particularly, Ni is preferable It is preferable that the doped amount of scandia in the SSZ of the air-electrode-side reaction layer composed of LaAMnO$_3$/SSZ in the present invention is 3 to 12 mol %. The reason is that the layer of this range has high oxygen-ionic conductivity. In order to increase oxygen-ionic conductivity, the amount of 8 to 12 mol % is more preferable.

LaAMnO$_3$/SSZ in the present invention may be further doped or mixed with a cerium-containing oxide. The reason is that if the LaAMnO$_3$/SSZ is doped or mixed with a cerium-containing oxide, it is possible to prevent the Mn component from diffusing into the electrolyte membrane, and a solid oxide fuel cell having excellent output performance and durability performance can be provided.

In order to prevent the Mn component from diffusing into the electrolyte membrane, a layer where LaAMnO$_3$ and a cerium-containing oxide are evenly mixed (hereafter referred to as LaAMnO$_3$/cerium-containing oxide) is preferable.

When lanthanum gallate represented by a general formula La$_{1-a}$A$_a$Ga$_{1-b}$B$_b$O$_3$ or La$_{1-a}$A$_a$Ga$_{1-b-c}$B$_b$C$_c$O$_3$ (where A is any one or more of Sr, Ca and Ba; B is composed of any one or more of Mg, Al, In; and C is any one or more of Co, Fe, Ni and Cr) is used as the first layer in the electrolyte membrane, since the diffusion of Mn components is particularly large, it is preferable to use the air-electrode-side reaction layer that can suppress the diffusion of Mn components such as the above-described LaAMnO$_3$/SSZ which is further doped or mixed with a cerium-containing oxide, or an LaAMnO$_3$/cerium-containing oxide.

The cerium-containing oxide is not specifically limited as fas as it is an oxide containing cerium. A cerium-containing oxide represented by a general formula $(CeO_2)_{1-2x}(B_2O_3)_x$ (where B is any one of Sm, Gd and Y, and $0.05 \leq X \leq 0.15$) is preferable because it has high oxygen-ionic conductivity.

The method for preparing the material for $LaAMnO_3$/SSZ in the present invention is not specifically limited as far as it can satisfy favorable properties as an air-electrode-side reaction layer. The examples of the method include a co-precipitation method, a powder mixing method, a spray thermal decomposition method, and a sol-gel method.

In the present invention, when the composition of lanthanum manganite represented by $LaAMnO_3$ (A is either Ca or Sr) of the air electrode is described as $(La_{1-x}A_x)_yMnO_3$, it is preferable that the values of x and y are within the ranges of $0.15 \leq x \leq 0.3$ and $0.97 \leq y \leq 1$ from electronic conductivity at 700° C. or above, the stability of the material, and the like.

The reason is that the electronic conductivity lowers in a case of x<0.15 or x>0.3, the reactivity rises and the activity of the electrode reaction layer lowers in a case of y<0.97, and the output performance of the cell lowers because reaction with zirconia forms an insulation layer represented by $La_2Zr_2O_7$ in a case of y>1.

The lanthanum manganite in the air electrode may be doped with Ce, Sm, Gd, Pr, Nd, Co, Al, Fe, Ni or Cr, in addition to Sr or Ca.

The method for preparing the material for the air electrode in the present invention is not specifically limited. The examples of the method include a powder mixing method, a co-precipitation method, a spray thermal decomposition method, and a sol-gel method.

It is preferable that the fuel electrode in the present invention has high electronic conductivity and high fuel-gas permeability, and can efficiently perform the reactions of Equation (2) and (3) in the fuel-gas atmosphere of the solid oxide fuel cell. Materials preferable in this point of view include a layer in which NiO and yttria-doped zirconia are evenly mixed (hereafter referred to as NiO/YSZ), and a layer in which NiO and a cerium-containing oxide are evenly mixed (hereafter referred to as NiO/cerium-containing oxide). NiO is reduced into Ni in the fuel-gas atmosphere of the solid oxide fuel cell, and the layers are converted to Ni/YSZ and Ni/cerium-containing oxide.

The cerium-containing oxide is not specifically limited as far as it is an oxide containing cerium. A cerium-containing oxide represented by a general formula $(CeO_2)_{1-2x}(B_2O_3)_x$ (where B is any one of Sm, Gd and Y, and $0.05 \leq X \leq 0.15$) is preferable because it has high oxygen-ionic conductivity.

In order to efficiently perform the reactions of Equations (2) and (3), and improve output performance, it is preferable to form a fuel-electrode-side reaction layer between the electrolyte membrane and the fuel electrode.

In the present invention, as the fuel-electrode-side reaction layer when a zirconia-based material, such as scandia-doped zirconia, is used as the third layer of the electrolyte membrane, a layer in which NiO and scandia-doped zirconia which excel in both electronic conductivity and oxygen-ionic conductivity are evenly mixed (hereafter referred to as NiO/SSZ) is preferable. NiO is reduced into Ni in the fuel-gas atmosphere of the solid oxide fuel cell, and the layer is converted to Ni/SSZ. It is preferable that the ratio of NiO/SSZ is 10/90 to 50/50 by weight. The reason is that if the ratio is lower than 10/90, the electronic conductivity is excessively low, and on the other hand, if the ratio is higher than 50/50, the oxygen-ionic conductivity is excessively low.

It is preferable that the doped amount of scandia in the SSZ in the NiO/SSZ of the present invention is 3 to 12 mol %. This range enables high oxygen-ionic conductivity, and can promote the reactions of Equations (2) and (3). Since the oxygen-ionic conductivity is high even at a low temperature of about 700° C., a solid oxide fuel cell having high output performance to a low temperature of about 700° C. can be provided.

The SSZ in the NiO/SSZ of the present invention may be further doped with at least one oxide of 5 mol % or less which is selected from a group of $CeO_2$, $Sm_2O_3$, $Gd_2O_3$, $Er_2O_3$, $Y_2O_3$, and $Bi_2O_3$. Two or more of them can also be doped. It is preferable that these materials are contained because improvement of the electronic conductivity as well as improvement of the oxygen-ionic conductivity can be expected.

In the present invention, as the fuel-electrode-side reaction layer when a cerium-containing oxide or lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr) is used as the third layer of the electrolyte membrane, a layer composed of NiO/cerium-containing oxide, which excels in both properties of electronic conductivity and oxygen-ionic conductivity is preferred. NiO is reduced into Ni in the fuel-gas atmosphere of the solid oxide fuel cell, and the layer is converted to Ni/cerium-containing oxide. It is preferable that the ratio of the NiO/cerium-containing oxide ratio is 10/90 to 50/50 by weight. The reason is that if the ratio is lower than 10/90, the electronic conductivity is excessively low, and on the other hand, if the ratio is higher than 50/50, the oxygen-ionic conductivity is excessively low.

The cerium-containing oxide is not specifically limited as far as it is an oxide containing cerium. A cerium-containing oxide represented by a general formula $(CeO_2)_{1-2x}(C_2O_3)_x$ (where C is any one of Sm, Gd, Y and La, and $0.05 \leq X \leq 0.15$) is preferable.

It is preferable that the fuel electrode in the present invention has high electronic conductivity in order to lower IR loss. From this point of view, it is preferable that the ratio of the NiO/YSZ and NiO/cerium-containing oxide is 50/50 to 90/10 by weight. The reason is that if the ratio is lower than 50/50, the electronic conductivity is low, and on the other hand, if the ratio is higher than 90/10, the output performance is deteriorated due to aggregation of Ni particles.

The composition of the fuel electrode in the present invention can include NiO/SSZ, and a layer in which NiO and calcium-doped zirconia are evenly mixed (hereafter referred to NiO/CSZ) instead of NiO/YSZ and NiO/cerium-containing oxide. YSZ is preferable because YSZ is more inexpensive than SSZ. However, NiO/CSZ is most preferable from the viewpoint of the costs because CSZ is further inexpensive than YSZ. NiO/CSZ is also converted to Ni/CSZ in the fuel-gas atmosphere of the fuel cell.

The method for synthesizing the material for the fuel electrode in the present invention is not specifically limited as far as the materials for the fuel electrode such as NiO/SSZ and NiO/YSZ are evenly mixed. The examples include a co-precipitation method and a spray drying method.

It is preferable that the interconnector in the present invention has high electronic conductivity and free of gas permeability in the air atmosphere and the fuel-gas atmosphere of the power-generating temperature of the solid oxide fuel cell, and is stable in an oxidation-reduction atmosphere. From this point of view, lanthanum chromite is most preferred.

Since lanthanum chromite is difficult to sinter, it is difficult to fabricate the interconnector having no gas permeability at a sintering temperature of the solid oxide fuel cell (1500° C. or below). In order to improve the sintering properties, it is preferable that lanthanum chromite is doped with Ca, Sr and Mg. Ca-doped lanthanum chromite is most preferable because it is possible to manufacture a membrane having the highest sintering properties and being free of gas permeability at a similar temperature in the case of the other materials for solid oxide fuel cells. The amount of Ca in lanthanum chromite to be used for the interconnector is not specifically limited. As the amount of Ca increases, the electronic conductivity becomes high. However, the stability of the material is deteriorated. Therefore, the amount of Ca is preferably 10 to 40 mol %.

The shape of the solid oxide fuel cell in the present invention is not specifically limited. A flat-plate type or a cylindrical type can be used. In the flat-plate type, the inter-connecter is referred to as a separator but has the same role as the inter-connecter. In the case of the separator, heat-resistant metal such as ferrite stainless steel can be used.

The solid oxide fuel cell according to the present invention can also be applied to a micro-tube type (outer diameter; 10 mm or less, preferably 5 mm or less).

EXAMPLES

Example 1

A cylindrical solid oxide fuel cell shown in FIG. 1 was used as a basic configuration. Specifically, the solid oxide fuel cell comprises an interconnector 2 and an electrolyte membrane 3 formed on a cylindrical air-electrode support 1, and a fuel electrode 4 formed on the electrolyte membrane 3 so as not to contact the interconnector 2. In Example 1, as shown in FIG. 2, the solid oxide fuel cell further comprises an electrode reaction layer formed between the air electrode and the electrolyte membrane, and a fuel-electrode-side reaction layer formed between the electrolyte membrane and the fuel electrode, in which the electrolyte membrane was composed of three layers.

(1) Fabrication of Air Electrode Support

The air electrode was composed of Sr-doped lanthanum manganite which is represented by a composition of $La_{0.75}Sr_{0.25}MnO_3$, and the material powder for the air electrode was prepared by a co-precipitation method and then heat-treated. The average particle diameter was 30 μm. The cylindrical body was fabricated by extrusion, and sintered at 1500° C. to form the air-electrode support 1.

(2) Formation of Air-Electrode-Side Reaction Layer

The air-electrode-side reaction layer was composed of $LaAMnO_3/SSZ$, and the composition and the weight ratio were $La_{0.75}Sr_{0.25}MnO_3/90$ mol % $ZrO_2$-10 mol % $Sc_2O_3$=50/50. Nitrate aqueous solutions of La, Sr, Mn, Zr and Sc were blended to have the above composition, and an oxalic acid was added to precipitate the composition. The material powder was obtained by drying and heat-treating the precipitate and the supernatant, and controlling the particle diameter. The average particle diameter was 2 μm. After mixing the powder for the electrode reaction layer of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 100 mPas. A film was formed from the slurry on the air-electrode support (outer diameter: 15 mm, thickness: 1.5 mm, effective length: 400 mm) using a slurry coating method, and sintered at 1400° C. The thickness was 20 μm.

(3) Preparation of Slurry for Electrolyte Membrane (First Layer)

The material for the first layer was SSZ, and the composition thereof was 90 mol % $ZrO_2$-10 mol % $Sc_2O_3$. $ZrO_2$ was dissolved in a concentrated nitric acid of 3N or more heated at 100° C., and diluted with distilled water to prepare a nitrate aqueous solution. A nitrate aqueous solution was prepared from $Sc_2O_3$ in the same manner. The nitrate aqueous solutions were blended to have the above composition, and an aqueous solution of an oxalic acid was added to cause co-precipitation. The material powder was obtained by drying the precipitate and the supernatant formed by co-precipitation at about 200° C., thermally decomposing at 500° C., and heat-treating at 800° C. for 10 hours. The average particle diameter was 0.5 μm. After mixing the material powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 140 mPas.

(4) Preparation of Slurry for Electrolyte Membrane (Second Layer)

The material for the second layer was YSZ, and the composition thereof was 90 mol % $ZrO_2$-10 mol % $Y_2O_3$. $ZrO_2$ was dissolved in a concentrated nitric acid of 3N or more heated at 100° C., and diluted with distilled water to prepare a nitrate aqueous solution. A nitrate aqueous solution was prepared from $Y_2O_3$ in the same manner. The nitrate aqueous solutions were blended to have the above composition, and an aqueous solution of an oxalic acid was added to cause co-precipitation. The material powder was obtained by drying the precipitate and the supernatant formed by co-precipitation at about 200° C., thermally decomposing at 500° C., and heat-treating at 800° C. for 10 hours. The average particle diameter was 0.5 μm. After mixing the material powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 140 mPas.

(5) Preparation of Slurry for Electrolyte Membrane (Third Layer)

The material for the third layer was SSZ, and the composition thereof was 90 mol % $ZrO_2$-10 mol % $Sc_2O_3$. $ZrO_2$ was dissolved in a concentrated nitric acid of 3N or more heated at 100° C., and diluted with distilled water to prepare a nitrate aqueous solution. A nitrate aqueous solution was prepared from $Sc_2O_3$ in the same manner. The nitrate aqueous solutions were blended to have the above composition, and an aqueous solution of an oxalic acid was added to cause co-precipitation. The material powder was obtained by drying the precipitate and the supernatant formed by co-precipitation at about 200° C., thermally decomposing at 500° C., and heat-treating at 800° C. for 10 hours. The average particle diameter was 0.5 μm. After mixing the material powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 140 mPas.

(6) Formation of Electrolyte Membrane

The first layer was formed on the above-described air-electrode-side reaction layer using a slurry coating method.

Next, the second layer was formed using a slurry coating method, and the third layer was formed using a slurry coating method. The layers were sintered at 1400° C. The thickness of the obtained electrolyte membrane was 30 μm (air-electrode-side first layer: 10 μm, second layer: 10 μm, third layer: 10 μm). The area where the interconnector was formed in the subsequent step was masked so as not to be coated.

(7) Preparation of Slurry for Fuel-Electrode-Side Reaction Layer

The fuel-electrode-side reaction layer was composed of NiO/SSZ, and the composition was NiO/90 mol % $ZrO_2$-10 mol % $Sc_2O_3$. Nitrate aqueous solutions of Ni, Zr and Sc were blended to have the above composition, and an oxalic acid was added to precipitate the composition. The material was obtained by drying and heat-treating the precipitate and the supernatant, and controlling the particle diameter. Two types of layers having a weight ratio of NiO/90 mol % $ZrO_2$-10 mol % $Sc_2O_3$=20/80 and 50/50 were formed, both of which had an average particle diameters of 0.5 μm. After mixing the powder of 100 parts by weight, an organic solvent (ethanol) of 500 parts by weight, a binder (ethyl cellulose) of 10 parts by weight, a dispersant (polyoxyethylene alkyl phosphoric acid ester) of 5 parts by weight, an antifoaming agent (sorbitan sesquiolate) of 1 part by weight, and a plasticizer (DBP) of 5 parts by weight, the mixture was sufficiently agitated to prepare a slurry. The viscosity of the slurry was 70 mPas.

(8) Formation of Fuel-Electrode-Side Electrode Reaction Layer

The cell was masked so as to make the area of the fuel-electrode-side layer 150 $cm^2$, and NiO/90 mol % $ZrO_2$-10 mol % $Sc_2O_3$=20/80 (average particle diameter: 0.5 μm) and 50/50 (average particle diameter: 0.5 μm) were formed in this order on the electolytic membrane using a slurry coating method. The thickness of the layer (after sintering) was 10 μm.

(9) Preparation of Slurry for Fuel Electrode

The fuel electrode was composed of NiO/YSZ, and the composition was NiO/90 mol % $ZrO_2$-10 mol % $Y_2O_3$. Nitrate aqueous solutions of Ni, Zr and Y were blended to have the above composition, and an oxalic acid was added to precipitate the composition. The material was obtained by drying and heat-treating the precipitate and the supernatant, and controlling the particle diameter. The composition and the weight ratio were NiO/90 mol % $ZrO_2$-10 mol % $Y_2O_3$=70/30, and the average particle diameter was 2 μm. After mixing the powder of 100 parts by weight, an organic solvent (ethanol) of 500 parts by weight, a binder (ethyl cellulose) of 20 parts by weight, a dispersant (polyoxyethylene alkyl phosphoric acid ester) of 5 parts by weight, an antifoaming agent (sorbitan sesquiolate) of 1 part by weight, and a plasticizer (DBP) of 5 parts by weight, the mixture was sufficiently agitated to prepare a slurry. The viscosity of the slurry was 250 mPas.

(10) Fabrication of Fuel Electrode

The fuel electrode was fabricated on the fuel-electrode-side reaction layer using a slurry coating method. The thickness of the membrane (after sintering) was 90 μm. Furthermore, the fuel-electrode-side reaction layer and the fuel electrode were sintered together at 1400° C.

(11) Fabrication of Interconnector

The interconnector was composed of Ca-doped lanthanum chromite which is represented by $La_{0.80}Ca_{0.20}CrO_3$. After preparing the lanthanum chromite using a spray pyrolysis method, heat treatment was performed to prepare the material powder. The average particle diameter of the obtained powder was 1 μm. After mixing the powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 100 mPas. The interconnector was formed using a slurry coating method, and sintered at 1400° C. The thickness after sintering was 40 μm.

Example 2

A solid oxide fuel cell was fabricated in the same manner as in Example 1 except that the material for the first layer was ScYSZ, and the composition was 90 mol % $ZrO_2$-5 mol % $Sc_2O_3$-5 mol % $Y_2O_3$.

Example 3

A solid oxide fuel cell was fabricated in the same manner as in Example 1 except that the material for the first layer was SSZ/YSZ, and the composition and the ratio were 90 mol % $ZrO_2$-10 mol % $Sc_2O_3$/90 mol % $ZrO_2$-10 mol % $Y_2O_3$=50/50; and the slurry was formed by adding 90 mol % $ZrO_2$-10 mol % $Sc_2O_3$ powder of 20 parts by weight having an average particle diameter of 0.5 μm prepared by the above-described co-precipitation method and 90 mol % $ZrO_2$-10 mol % $Y_2O_3$ powder of 20 parts by weight having an average particle diameter of 0.5 μm prepared by the above-described co-precipitation method.

Example 4

A solid oxide fuel cell was fabricated in the same manner as in Example 1 except that the material for the first layer was SSZ, and the composition was 89 mol % $ZrO_2$-10 mol % $Sc_2O_3$-1 mol % $CeO_2$.

Example 5

A solid oxide fuel cell was fabricated in the same manner as in Example 1 except that the material for the first layer was SSZ, and the composition was 89 mol % $ZrO_2$-10 mol % $Sc_2O_3$-0.5 mol % $Bi_2O_3$-0.5 mol % $CeO_2$.

Example 6

A solid oxide fuel cell was fabricated in the same manner as in Example 1 except that the material for the first layer was $(CeO_2)_{0.8}(Gd_2O_3)_{0.1}$, $CeO_2$ and $Gd_2O_3$ were prepared using the above-described co-precipitation method, and the average particle diameter was 0.5 μm.

Example 7

A solid oxide fuel cell was fabricated in the same manner as in Example 1 except that the material for the first layer was $(CeO_2)_{0.8}(Gd_2O_3)_{0.1}$, the material for the second layer was ScYSZ, and the composition of the second layer was 90 mol % $ZrO_2$-5 mol % $Sc_2O_3$-5 mol % $Y_2O_3$.

Example 8

A solid oxide fuel cell was fabricated in the same manner as in Example 1 except that the material for the third layer was ScYSZ, and the composition was 90 mol % $ZrO_2$-5 mol % $Sc_2O_3$-5 mol % $Y_2O_3$.

Example 9

A solid oxide fuel cell was fabricated in the same manner as in Example 1 except that the material for the first layer and the third layer was ScYSZ, and the composition was 90 mol % $ZrO_2$-5 mol % $Sc_2O_3$-5 mol % $Y_2O_3$.

Example 10

A solid oxide fuel cell was fabricated in the same manner as in Example 1 except that the material for the first layer was $(CeO_2)_{0.8}(Gd_2O_3)_{0.1}$, the material for the third layer was ScYSZ, and the composition of the third layer was 90 mol % $ZrO_2$-5 mol % $Sc_2O_3$-5 mol % $Y_2O_3$.

Example 11

A solid oxide fuel cell was fabricated in the same manner as in Example 1 except that the material for the first layer and the third layer was ScYSZ, and the composition was 90 mol % $ZrO_2$-8 mol % $Sc_2O_3$-2 mol % $Y_2O_3$; and the material for the second layer was ScYSZ, and the composition was 90 mol % $ZrO_2$-5 mol % $Sc_2O_3$-5 mol % $Y_2O_3$.

Comparative Example 1

A solid oxide fuel cell was fabricated in the same manner as in Example 1 except that the electrolyte membrane was composed of 90 mol % $ZrO_2$-10 mol % $Y_2O_3$ alone, and the thickness was 30 µm.

(Power Generation Test)

A power generation test was conducted using cells fabricated in Examples 1 to 11 and Comparative Example 1 (effective area of fuel electrode: 150 cm$^2$). The operating conditions of the test were as follows:

Fuel: $(H_2+11\% H_2O):N_2=1:2$
Oxidant: Air
Power generating temperature: 800° C.
Current density: 0.3 Acm$^{-2}$ (Gas Leakage Test)

Nitrogen gas was flowed into the air electrode support of each cell fabricated in Examples 1 to 11 and Comparative Example 1, pressure of 0.1 MPa was supplied from the air electrode, and the amount of the gas permeated the electrolyte membrane was measured. With this test, the gas permeability of the electrolyte membrane was evaluated.

TABLE 3

|  | Potential (V) | Gas permeation amount Q ($10^{-10}$ ms$^{-1}$ Pa$^{-1}$) |
|---|---|---|
| Example 1 | 0.683 | 1.8 |
| Example 2 | 0.662 | 0.9 |
| Example 3 | 0.664 | 0.7 |
| Example 4 | 0.687 | 2.2 |
| Example 5 | 0.685 | 1.0 |
| Example 6 | 0.680 | 2.8 |
| Example 7 | 0.687 | 2.5 |
| Example 8 | 0.665 | 1.3 |
| Example 9 | 0.648 | 0.8 |
| Example 10 | 0.665 | 2.1 |
| Example 11 | 0.670 | 1.5 |
| Comparative Example 1 | 0.570 | 1.5 |

Table 3 shows the results of the potentials in the power generation test and the gas permeation amount of the electrolyte membrane. The gas permeation amount Q in Examples 1 to 11 and Comparative Example 1 was within the more preferable range of $2.8 \times 10^{-10}$ ms$^{-1}$ Pa$^{-1}$ or less, and it was confirmed that there is no problem about the gas permeability of the electrolyte membrane. As for the generated potential, it was 0.6 V or more in Examples 1 to 11, while it was 0.57 V in Comparative Example 1 which is evidently low. From the above results, it was confirmed that a solid oxide fuel cell having excellent output performance can be provided by forming the first, second and third layers with SSZ, YSZ and SSZ; SSZ/YSZ, YSZ and SSZ; $(CeO_2)_{0.8}(Gd_2O_3)_{0.1}$, ScYSZ and SSZ; ScYSZ, YSZ and ScYSZ; or the like, respectively.

As shown in Examples 4 and 5 and Table 1, it was confirmed that the use of SSZ further doped with at least one oxide of 5 mol % or less which is selected from a group consisting of $CeO_2$, $Sm_2O_3$, $Gd_2O_3$, $Yb_2O_3$, $Er_2O_3$, and $Bi_2O_3$, was more preferable because the power generating performance was improved and the gas permeability of the electrolyte membrane was reduced.

Example 12

A solid oxide fuel cell was fabricated in the same manner as in Example 1 except that the material for the third layer in the electrolyte membrane was a cerium-containing oxide having a composition of $(CeO_2)_{0.8}(Sm_2O_3)_{0.1}$; the $(CeO_2)_{0.8}(Sm_2O_3)_{0.1}$ was prepared using the above-described co-precipitation method to have an average particle diameter of 0.5 µm; the third layer was formed on the first and second layers of Example 1, and sintered at 1420° C.; and the material for the fuel-electrode-side reaction layer and the fuel electrode was NiO/cerium-containing oxide having a composition of NiO/$(CeO_2)_{0.8}(Sm_2O_3)_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter, in which two types of composition and weight ratio of NiO/$(CeO_2)_{0.8}(Sm_2O_3)_{0.1}$=20/80 and 50/50 were prepared for the fuel-electrode-side reaction layer, both of which had an average particle diameter of 0.5 µm and the composition and the weight ratio of the fuel electrode was NiO/$(CeO_2)_{0.8}(Sm_2O_3)_{0.1}$=70/30.

Example 13

A solid oxide fuel cell was fabricated in the same manner as in Example 12 except that the material for the first layer in the electrolyte membrane was a cerium-containing oxide having a composition of $(CeO_2)0.8(Gd_2O_3)_{0.1}$.

Example 14

A solid oxide fuel cell was fabricated in the same manner as in Example 12 except that the material for the first layer in the electrolyte membrane was a cerium-containing oxide having a composition of $(CeO_2)_{0.8}(Gd_2O_3)_{0.1}$; and the material for the second layer was ScYSZ having a composition of 90 mol % $ZrO_2$-5 mol % $Sc_2O_3$-5 mol % $Y_2O_3$.

Example 15

A solid oxide fuel cell was fabricated in the same manner as in Example 12 except that the material for the first layer in the electrolyte membrane was ScYSZ having a composition of 90 mol % $ZrO_2$-5 mol % $Sc_2O_3$-5 mol % $Y_2O_3$.

Comparative Example 2

A solid oxide fuel cell was fabricated in the same manner as in Example 12 except that the electrolyte membrane was composed of $(CeO_2)_{0.8}(Sm_2O_3)_{0.1}$ alone, the thickness was 30 μm, and the sintering temperature was 1430° C.

(Power Generation Test)

A power generation test was conducted using cells fabricated in Examples 12 to 15 and Comparative Examples 1 and 2 (effective area of fuel electrode: 150 cm$^2$). The operating conditions of the test were as follows:

Fuel: $(H_2+11\% H_2O):N_2=1:2$
Oxidant: Air
Power generating temperature: 800° C.
Current density: 0.3 Acm$^{-2}$ (Gas Leakage Test)

Nitrogen gas was flowed into the air electrode support of each cell fabricated in Examples 12 to 15 and Comparative Examples 1 and 2, pressure of 0.1 MPa was supplied from the air electrode, and the amount of the gas permeated the electrolyte membrane was measured. With this test, the gas permeability of the electrolyte membrane was evaluated.

TABLE 4

|  | Potential (V) | Gas permeation amount Q ($10^{-10}$ ms$^{-1}$ Pa$^{-1}$) |
|---|---|---|
| Example 12 | 0.680 | 2.8 |
| Example 13 | 0.680 | 4.3 |
| Example 14 | 0.685 | 3.6 |
| Example 15 | 0.660 | 2.5 |
| Comparative Example 1 | 0.570 | 1.5 |
| Comparative Example 2 | 0.104 | 4.5 |

Table 4 shows the results of the potentials in the power generation test and the gas permeation amount of the electrolyte membrane. The gas permeation amount Q in Examples 12, 15 and Comparative Example 1 was within the more preferable range of $2.8 \times 10^{-10}$ ms$^{-1}$Pa$^{-1}$ or less, the gas permeation amount Q in Examples 13, 14 and Comparative Example 2 was within the preferable range of $2.8 \times 10^{-9}$ ms$^{-1}$Pa$^{-1}$ or less, and it was confirmed that there is no problem about the gas permeability of the electrolyte membrane. As for the generated potential, it was 0.6 V or more in Examples 12 to 15, while it was 0.57 V in Comparative Example 1 and it was 0.1 V in Comparative Example 2, which are extremely low. This is because the cerium-containing oxide had electronic conductivity due to exposure to an oxidation-reduction atmosphere and the electromotive force was significantly lowered in the case of $(CeO_2)_{0.8}(Sm_2O_3)_{0.1}$ alone. As shown in Examples 12 to 15, it was confirmed that a solid oxide fuel cell having excellent output performance can be provided by forming the first, second and third layers with SSZ, YSZ and $(CeO_2)_{0.8}(Sm_2O_3)_{0.1}$; $(CeO_2)_{0.8}(Gd_2O_3)_{0.1}$, YSZ and $(CeO_2)_{0.8}(Sm_2O_3)_{0.1}$; ScYSZ, YSZ and $(CeO_2)_{0.8}(Sm_2O_3)_{0.1}$; or the like.

Example 16

A solid oxide fuel cell was fabricated in the same manner as in Example 1 except that the material for the first layer was lanthanum gallate having a composition of $La_{0.8}Sr_{0.2}Ga_{0.8}Mg_{0.2}O_3$ which was prepared by blending $La_2O_3$, $SrCO_3$, $Ga_2O_3$ and MgO so as to have the above-described composition, mixing them in a ball mill, performing heat treatment at 1200° C., and grinding to have an average particle diameter of 0.5 μm; the material powder for the air-electrode-side reaction layer was prepared by mixing powder of $La_{0.75}Sr_{0.25}MnO_3$, 90 mol % $ZrO_2$-10 mol % $Sc_2O_3$, and $(CeO_2)_{0.8}(Sm_2O_3)_{0.1}$, performing heat treatment, grinding, and controlling the particle diameter such that the average particle diameter was 2 μm, and the composition and the weight ratio of the material were $La_{0.75}Sr_{0.25}MnO_3$/90 mol % $ZrO_2$-10 mol % $Sc_2O_3$/$(CeO_2)_{0.8}(Sm_2O_3)_{0.1}$=40/40/20.

Example 17

A solid oxide fuel cell was fabricated in the same manner as in Example 16 except that the material for the first layer was lanthanum gallate having a composition of $La_{0.8}Sr_{0.2}Ga_{0.8}Mg_{0.2}O_3$; and the material for the third layer was ScYSZ having a composition of 90 mol % $ZrO_2$-5 mol % $Sc_2O_3$-5 mol % $Y_2O_3$.

Example 18

A solid oxide fuel cell was fabricated in the same manner as in Example 1 except that the material for the first layer was lanthanum gallate having a composition of $La_{0.8}Sr_{0.2}Ga_{0.8}Mg_{0.2}O_3$; the material powder for the air-electrode-side reaction layer was prepared by mixing powder of $La_{0.75}Sr_{0.25}MnO_3$, 90 mol % $ZrO_2$-10 mol % $Sc_2O_3$, and $(CeO_2)_{0.8}(Sm_2O_3)_{0.1}$, performing heat treatment, grinding, and controlling the particle diameter such that the average particle diameter was 2 μm, and the composition and the weight ratio of the material were $La_{0.75}Sr_{0.25}MnO_3$/90 mol % $ZrO_2$-10 mol % $Sc_2O_3$/$(CeO_2)_{0.8}(Sm_2O_3)_{0.1}$=40/40/20; the material for the third layer was a cerium-containing oxide having a composition of $(CeO_2)_{0.8}(Sm_2O_3)_{0.1}$ which was prepared by the above-described co-precipitation method, and the average particle size was 0.5 μm; the material for the fuel-electrode-side reaction layer and the fuel electrode was NiO/cerium-containing oxide having a composition of NiO/$(CeO_2)_{0.8}(Sm_2O_3)_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter, in which two types of composition and weight ratio of the fuel-electrode-side reaction layer of NiO/$(CeO_2)_{0.8}(Sm_2O_3)_{0.1}$=20/80 and 50/50 were prepared, both of which had an average particle diameter of 0.5 μm, and the composition and the weight ratio of the fuel electrode was NiO/$(CeO_2)_{0.8}(Sm_2O_3)_{0.1}$=70/30.

Example 19

A solid oxide fuel cell was fabricated in the same manner as in Example 18 except that the material for the third layer was lanthanum gallate having a composition of $La_{0.8}Sr_{0.2}Ga_{0.8}Mg_{0.115}Co_{0.0850}O_3$.

Example 20

A solid oxide fuel cell was fabricated in the same manner as in Example 18 except that the material for the first layer was a cerium-containing oxide having a composition of $(CeO_2)_{0.8}(Gd_2O_3)_{0.1}$; and the material for the third layer was lanthanum gallate having a composition of $La_{0.8}Sr_{0.2}Ga_{0.8}Mg_{0.2}O_3$.

Example 21

A solid oxide fuel cell was fabricated in the same manner as in Example 18 except that the material for the first layer and the third layer was lanthanum gallate having a composition of $La_{0.8}Sr_{0.2}Ga_{0.8}Mg_{0.2}O_3$.

Example 22

A solid oxide fuel cell was fabricated in the same manner as in Example 18 except that the first layer was ScYSZ having a composition of 90 mol % $ZrO_2$-5 mol % $Sc_2O_3$-5 mol % $Y_2O_3$; and the material for the third layer was lanthanum gallate having a composition of $La_{0.8}Sr_{0.2}Ga_{0.8}Mg_{0.2}O_3$.

Example 23

A solid oxide fuel cell was fabricated in the same manner as in Example 18 except that the material for the first layer and the third layer was lanthanum gallate having a composition of $La_{0.8}Sr_{0.2}Ga_{0.8}Mg_{0.2}O_3$; and the material for the second layer was SSZ having a composition of 90 mol % $ZrO_2$-10 mol % $Sc_2O_3$.

Example 24

A solid oxide fuel cell was fabricated in the same manner as in Example 18 except that the material for the first layer was a cerium-containing oxide having a composition of $(CeO_2)_{0.8}(Gd_2O_3)_{0.1}$; the material for the third layer was lanthanum gallate having a composition of $La_{0.8}Sr_{0.2}Ga_{0.8}Mg_{0.2}O_3$; and the material for the second layer was SSZ having a composition of 90 mol % $ZrO_2$-10 mol % $Sc_2O_3$.

Comparative Example 3

A solid oxide fuel cell was fabricated in the same manner as in Example 18 except that the electrolyte membrane was composed of $La_{0.8}Sr_{0.2}Ga_{0.8}Mg_{0.2}O_3$ alone, and the thickness was 30 μm.

(Power Generation Test)

A power generation test was conducted using cells fabricated in Examples 16 to 24 and Comparative Examples 1 to 3 (effective area of fuel electrode: 150 cm$^2$). The operating conditions of the test were as follows:

Fuel: ($H_2$+11% $H_2O$):$N_2$=1:2
Oxidant: Air
Power generating temperature: 800° C.
Current density: 0.3 Acm$^{-2}$ (Gas Leakage Test)

Nitrogen gas was flowed into the air electrode support of each cell fabricated in Examples 16 to 24 and Comparative Examples 1 to 3, pressure of 0.1 MPa was supplied from the air electrode, and the amount of the gas permeated the electrolyte membrane was measured. With this test, the gas permeability of the electrolyte membrane was evaluated.

TABLE 5

| | Potential (V) | Gas permeation amount Q ($10^{-10}$ ms$^{-1}$ Pa$^{-1}$) |
|---|---|---|
| Example 16 | 0.665 | 2.3 |
| Example 17 | 0.658 | 1.7 |
| Example 18 | 0.666 | 2.8 |
| Example 19 | 0.685 | 2.2 |
| Example 20 | 0.687 | 2.8 |
| Example 21 | 0.674 | 1.4 |
| Example 22 | 0.678 | 1.3 |
| Example 23 | 0.683 | 2.4 |
| Example 24 | 0.690 | 2.8 |
| Comparative Example 1 | 0.570 | 1.5 |
| Comparative Example 2 | 0.104 | 4.5 |
| Comparative Example 3 | 0.303 | 1.2 |

Table 5 shows the results of the potentials in the power generation test and the gas permeation amount of the electrolyte membrane. The gas permeation amount Q in Examples 16 to 24 and Comparative Examples 1 and 3 was within the more preferable range of $2.8 \times 10^{-10}$ ms$^{-1}$Pa$^{-1}$ or less, the gas permeation amount Q in Comparative Example 2 was within the preferable range of $2.8 \times 10^{-9}$ ms$^{-1}$Pa$^{-1}$ or less, and it was confirmed that there is no problem about the gas permeability of the electrolyte membrane. As for the generated potential, it was 0.6 V or more in Examples 16 to 24, while it was 0.57 V in Comparative Example 1, 0.1 V in Comparative Example 2, and 0.3 V in Comparative Example 3, which are extremely low. This is because the cerium-containing oxide had electronic conductivity due to exposure to an oxidation-reduction atmosphere and the electromotive force was significantly lowered in the case of $(CeO_2)_{0.8}(Gd_2O_3)_{0.1}$ alone, and Mn from the air-electrode-side reaction layer and the air electrode is incorporated in $La_{0.8}Sr_{0.2}Ga_{0.8}Mg_{0.2}O_3$, which causes electronic conductivity and lowers the electromotive force in the case of $La_{0.8}Sr_{0.2}Ga_{0.8}Mg_{0.2}O_3$ alone. On the other hand, as shown in Examples 16 to 24, it was confirmed that a solid oxide fuel cell having excellent output performance can be provided by forming the second layer with at least zirconia, and providing $(CeO_2)_{0.8}(Sm_2O_3)_{0.1}$ or $La_{0.8}Sr_{0.2}Ga_{0.8}Mg_{0.2}O_3$ on the air-electrode side and/or fuel-electrode side.

From the above results of Examples 1 to 24 and Comparative Examples 1 to 3, it was confirmed that a solid oxide fuel cell having excellent output performance can be provided by forming the electrolyte membrane such that the second layer is composed of a material containing at least zirconia, the first layer on the air-electrode side is composed of a material having higher oxygen-ionic conductivity than the second layer, and the third layer on the fuel-electrode side is composed of a material having higher oxygen-ionic conductivity than the second layer.

(Thickness Ratio of Second Layer in Electrolyte membrane)

Example 25

A solid oxide fuel cell was fabricated in the same manner as in Example 1 except that the thickness of the first layer was 1 μm, the thickness of the second layer was 28 μm, and the thickness of the third layer was 1 μm.

Example 26

A solid oxide fuel cell was fabricated in the same manner as in Example 1 except that the thickness of the first layer was 1.5 μm, the thickness of the second layer was 27 μm, and the thickness of the third layer was 1.5 μm.

Example 27

A solid oxide fuel cell was fabricated in the same manner as in Example 1 except that the thickness of the first layer was 3 µm, the thickness of the second layer was 24 µm, and the thickness of the third layer was 3 µm.

Example 28

A solid oxide fuel cell was fabricated in the same manner as in Example 1 except that the thickness of the first layer was 4.5 µm, the thickness of the second layer was 21 µm, and the thickness of the third layer was 4.5 µm.

Example 29

A solid oxide fuel cell was fabricated in the same manner as in Example 1 except that the thickness of the first layer was 7.5 µm, the thickness of the second layer was 15 µm, and the thickness of the third layer was 7.5 µm.

Example 30

A solid oxide fuel cell was fabricated in the same manner as in Example 1 except that the thickness of the first layer was 10.5 µm, the thickness of the second layer was 9 µm, and the thickness of the third layer was 10.5 µm.

Example 31

A solid oxide fuel cell was fabricated in the same manner as in Example 1 except that the thickness of the first layer was 12 µm, the thickness of the second layer was 6 µm, and the thickness of the third layer was 12 µm.

Example 32

A solid oxide fuel cell was fabricated in the same manner as in Example 1 except that the thickness of the first layer was 13.5 µm, the thickness of the second layer was 3 µm, and the thickness of the third layer was 13.5 µm.

Example 33

A solid oxide fuel cell was fabricated in the same manner as in Example 1 except that the thickness of the first layer was 14 µm, the thickness of the second layer was 2 µm, and the thickness of the third layer was 14 µm.

Comparative Example 4

A solid oxide fuel cell was fabricated in the same manner as in Example 1 except that the electrolyte membrane was composed of 90 mol % $ZrO_2$-10 mol % $Sc_2O_3$ alone, the thickness was 30 µm, and the sintering temperature was 1420° C.

(Power Generation Test)

A power generation test was conducted using cells fabricated in Examples 1, 25 to 33 and Comparative Examples 1 and 4 (effective area of fuel electrode: 150 cm$^2$). The operating conditions of the test were as follows:

Fuel: $(H_{2+11}\% H_2O):N_{2=1:2}$
Oxidant: Air
Power generating temperature: 800° C.
Current density: 0.3 Acm$^{-2}$ (Gas Leakage Test)

Nitrogen gas was flowed into the air electrode support of each cell fabricated in Examples 1, 25 to 33 and Comparative Examples 1 and 4, pressure of 0.1 MPa was supplied from the air electrode, and the amount of the gas permeated the electrolyte membrane was measured. With this test, the gas permeability of the electrolyte membrane was evaluated.

TABLE 6

| | Thickness ratio of second layer (%) | Generated potential (V) | Gas Permeation amount Q ($\times 10^{-10}$ ms$^{-1}$ Pa$^{-1}$) |
|---|---|---|---|
| Example 1 | 33.3 | 0.683 | 1.8 |
| Example 25 | 93.3 | 0.577 | 1.0 |
| Example 26 | 90.0 | 0.615 | 1.0 |
| Example 27 | 80.0 | 0.640 | 1.2 |
| Example 28 | 70.0 | 0.670 | 1.3 |
| Example 29 | 50.0 | 0.680 | 1.4 |
| Example 30 | 30.0 | 0.683 | 2.0 |
| Example 31 | 20.0 | 0.682 | 2.5 |
| Example 32 | 10.0 | 0.677 | 3.5 |
| Example 33 | 6.7 | 0.668 | 5.5 |
| Comparative Example 1 | 100 | 0.570 | 1.5 |
| Comparative Example 4 | 0 | 0.650 | 7.8 |

Table 6 shows the results of the generated potentials of the cells and the gas permeation amount of the electrolyte membrane when the thickness of the second layer was varied. It was confirmed that the generated potentials were all higher than the potential of Comparative Example 1, and that output performance was improved by providing the first layer on the air-electrode side and the third layer on the fuel-electrode side. Although the generated potential in Example 25 was substantially the same as that of Comparative Example 1, the potential sharply rose when the thickness of the second layer of Example 26 was reduced to 90% or below, and the potential had a tendency to rise until the thickness was reduced to 30%. On the other hand, when the thickness was reduced to 30% or below, the potential had a tendency to lower. As for the gas permeability, although the gas permeation amount Q was in the preferable range of 2.8×10$^{-9}$ ms$^{-1}$Pa$^{-1}$ or less, the gas permeation amount Q had a tendency to increase as the second layer was thinner, and increase sharply when the thickness of the second layer was less than 10%. From the above results, since the effect of the potential improvement was small when the second layer was thicker than 90%, and the gas permeation amount was large and the potential lowered when the second layer was thinner than 10%, it was confirmed that the thickness of the second layer was preferably within the range between 10 and 90%. Furthermore, from the results of the generated potential and the results of the gas permeation amount, it was confirmed that the thickness of the second layer was preferably within the range between 20 and 70%.

(Effect of Sintering Temperature)

Example 34

A solid oxide fuel cell was fabricated in the same manner as in Example 1 except that the sintering temperature of the electrolyte membrane was 1340° C.

Example 35

A solid oxide fuel cell was fabricated in the same manner as in Example 1 except that the sintering temperature of the electrolyte membrane was 1350° C.

Example 36

A solid oxide fuel cell was fabricated in the same manner as in Example 1 except that the sintering temperature of the electrolyte membrane was 1450° C.

Example 37

A solid oxide fuel cell was fabricated in the same manner as in Example 1 except that the sintering temperature of the electrolyte membrane was 1500° C.

Example 38

A solid oxide fuel cell was fabricated in the same manner as in Example 1 except that the sintering temperature of the electrolyte membrane was 1510° C.

(Power Generation Test)

A power generation test was conducted using cells fabricated in Examples 1 and 34 to 38, and Comparative Example 1 (effective area of fuel electrode: 150 cm$^2$). The operating conditions of the test were as follows:

Fuel: ($H_2$+11% $H_2O$):$N_2$=1:2
Oxidant: Air
Power generating temperature: 800° C.
Current density: 0.3 $Acm^{-2}$ (Gas Leakage Test)

Nitrogen gas was flowed into the air electrode support of each cell fabricated in Examples 1 and 34 to 38, and Comparative Example 1, pressure of 0.1 MPa was supplied from the air electrode, and the amount of the gas permeated the electrolyte membrane was measured. With this test, the gas permeability of the electrolyte membrane was evaluated.

TABLE 7

| | Sintering temperature (° C.) | Generated potential (V) | Gas Permeation amount Q (×10$^{-10}$ ms$^{-1}$ Pa$^{-1}$) |
|---|---|---|---|
| Example 1 | 1400 | 0.683 | 1.8 |
| Example 34 | 1340 | 0.584 | 10.0 |
| Example 35 | 1350 | 0.610 | 3.7 |
| Example 36 | 1450 | 0.675 | 0.9 |
| Example 37 | 1500 | 0.621 | 0.7 |
| Example 38 | 1510 | 0.582 | 0.9 |
| Comparative Example 1 | 1400 | 0.570 | 1.5 |

Table 7 shows the results of the generated potential and the gas permeation amount with respect to the sintering temperature of the electrolyte membrane. Although the generated potentials in the cases of 1340° C. and 1510° C. were higher than the potential of Comparative Example 1, there was little difference. The gas permeation amount Q was in the preferable range of 2.8×10$^{-9}$ ms$^{-1}$ Pa$^{-1}$ or less as the electrolyte membrane. From the above results, the sintering temperature of the electrolyte membrane is preferably within the range between 1350 and 1500° C.

In these examples, the electrolyte membrane was formed on the air-electrode support. However, it was assumed that the effect of efficiently promoting the reactions of Equations (2) and (3) taking place between the electrolyte membrane and the fuel electrode, and efficiently promoting the reaction of Equation (1) taking place between the air electrode and the electrolyte membrane can be obtained, and the power generating performance of the same level can be achieved.

(Power Generation Test)

Figure 4:
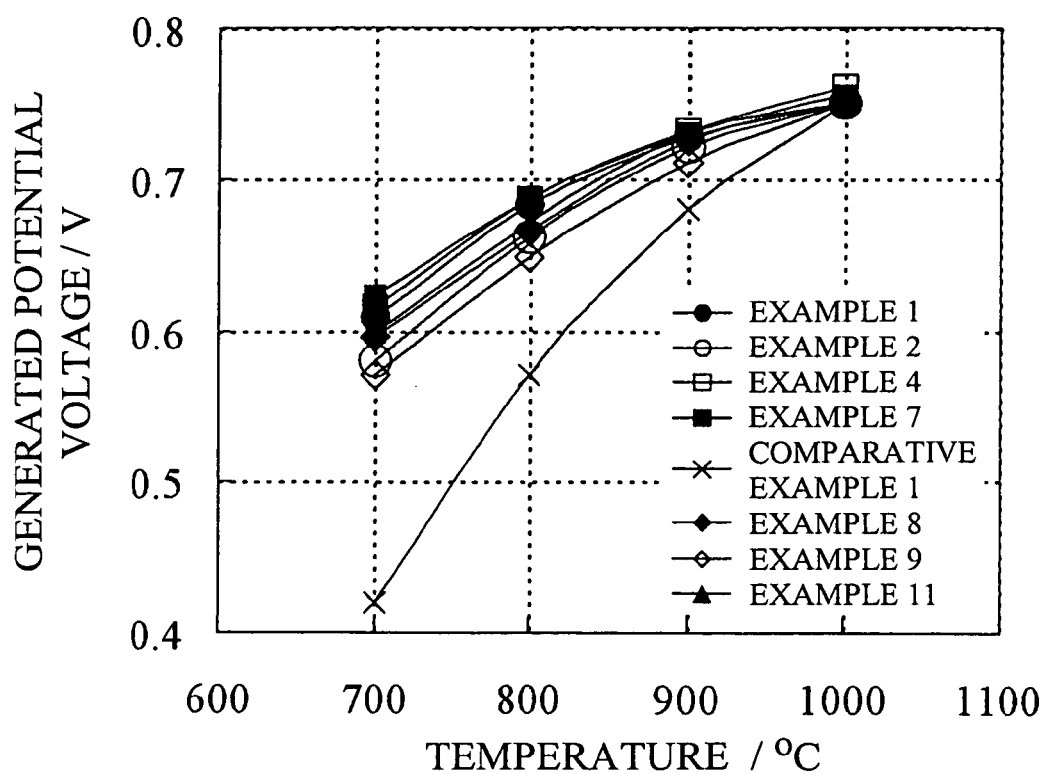
FIG. 4 is a graph showing the relationship between the power generating temperature x-axis) and the generated potential of a test cell (y-axis).

A power generation test was conducted using cells fabricated in Examples 1, 2, 4, 7 to 9 and 11, and Comparative Examples 1 (effective area of fuel electrode: 150 cm$^2$). The operating conditions of the test were as follows:

Fuel: ($H_{2+11}$% $H_2O$):$N_{2=1:2}$
Oxidant: Air
Power generating temperature: 700-1000° C.
Current density: 0.3 $Acm^{-2}$ FIG. 4 shows the generated potentials in the cases of 700 to 1000° C. It was confirmed that although there was little difference in the generated potentials at 900 to 1000° C., the potential difference was large at 900° C. or below with respect to the comparative example, and the difference was about 0.2 V at 700° C. From the above results, it was confirmed that a solid oxide fuel cell having excellent output performance within the range of between 700° C. and 1000° C. can be provided by employing the composition shown in Examples 1, 2, 4, 7 to 9, and 11 as the electrolyte membrane.

What is claimed is:

1. A solid oxide fuel cell comprising a single cell having an air electrode disposed on a surface of an electrolyte membrane and a fuel electrode disposed on the other surface of the electrolyte membrane, a fuel-electrode-side reaction layer having open pores interposed between the electrolyte membrane and the fuel electrode so as to accelerate the reaction of forming $H_2O$ and/or $CO_2$ and electron from at least hydrogen gas ($H_2$) and/or carbon monoxide gas (CO) contained in fuel gas, and oxygen ion ($O^{2-}$), and an interconnector having a role of electrical connection;

wherein the electrolyte membrane is provided with a first layer composed of a material having an oxygen-ionic conductivity of S1 on the air-electrode side, a third layer composed of a material having an oxygen-ionic conductivity of S3 on the fuel-electrode side, and a second layer composed of a material containing at least zirconia and having an oxygen-ionic conductivity of S2 between the first layer and the third layer;

wherein the oxygen-ionic conductivity of S1 and the oxygen-ionic conductivity of S2 have a relationship of S1>S2, and the oxygen-ionic conductivity of S3 and the oxygen-ionic conductivity of S2 have a relationship of S3>S2; and wherein the fuel-electrode-side reaction layer comprises a layer in which NiO and scandia-doped zirconia are evenly mixed, or Ni and scandia-doped zirconia are evenly mixed.

2. The solid oxide fuel cell according to claim 1, wherein the first layer comprises a material having an oxygen-ionic conductivity of S1 has the same composition as the third layer comprises a material having an oxygen-ionic conductivity of S3 in the electrolyte membrane.

3. The solid oxide fuel cell according to claim 1, wherein the thickness of the second layer is 10 to 90% with respect to the total thickness of the electrolyte membrane.

4. The solid oxide fuel cell according to claim 1, wherein the thickness of the second layer is 20 to 70% with respect to the total thickness of the electrolyte membrane.

5. The solid oxide fuel cell according to claim 1, wherein the second layer comprises a yttria-doped zirconia material.

6. The solid oxide fuel cell according to claim 1, wherein the second layer comprises a zirconia material doped with at least scandia and yttria.

7. The solid oxide fuel cell according to claim 1, wherein the first layer and the third layer comprise scandia-doped zirconia material.

8. The solid oxide fuel cell according to claim 1, wherein the first layer comprises a cerium-containing oxide represented by a general formula $(CeO_2)_{1-2x}(B_2O_3)_x$ (where B is any one of Sm, Gd and Y, and $0.05 \leq X \leq 0.15$), and the third layer comprises a scandia-doped zirconia material.

9. The solid oxide fuel cell according to claim 1, wherein the first layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr), and the third layer is a scandia-doped zirconia material.

10. The solid oxide fuel cell according to claim 1, wherein the first layer is a zirconia material doped with at least scandia and yttria, and the third layer comprises a scandia-doped zirconia material.

11. The solid oxide fuel cell according to claim 1, wherein the first layer comprises a scandia-doped zirconia material, and the third layer comprises a cerium-containing oxide represented by a general formula $(CeO_2)_{1-2x}(B_2O_3)_x$ (where B is any one of Sm, Gd and Y, and $0.05 \leq X \leq 0.15$).

12. The solid oxide fuel cell according to claim 1, wherein the first layer and the third layer comprise a cerium-containing oxide represented by a general formula $(CeO_2)_{1-2x}(B_2O_3)_x$ (where B is any one of Sm, Gd and Y, and $0.05 \leq X \leq 0.15$).

13. The solid oxide fuel cell according to claim 1, wherein the first layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr), an the third layer comprises a cerium-containing oxide represented by a general formula $(CeO_2)_{1-2x}(B_2O_3)_x$ (where B is any one of Sm, Gd and Y, and $0.05 \leq X \leq 0.15$).

14. The solid oxide fuel cell according to claim 1, wherein the first layer comprises a zirconia material doped with at least scandia and yttria, and the third layer comprises a cerium-containing oxide represented by a general formula $(CeO_2)_{1-2x}(B_2O_3)_x$ (where B is any one of Sm, Gd and Y, and $0.05 \leq X \leq 0.15$).

15. The solid oxide fuel cell according to claim 1, wherein the first layer comprises a scandia-doped zirconia material, and the third layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr).

16. The solid oxide fuel cell according to claim 1, wherein the first layer comprises a cerium-containing oxide represented by a general formula $(CeO_2)_{1-2x}(B_2O_3)_x$ (where B is any one of Sm, Gd and Y, and $0.05 \leq X \leq 0.15$), and the third layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr).

17. The solid oxide fuel cell according to claim 1, wherein the first layer and the third layer comprise lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr).

18. The solid oxide fuel cell according to claim 1, wherein the first layer comprises a zirconia material doped with at least scandia and yttria, and the third layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr).

19. The solid oxide fuel cell according to claim 1, wherein the first layer comprises a scandia-doped zirconia material, and the third layer comprises a zirconia material doped with at least scandia and yttria.

20. The solid oxide fuel cell according to claim 1, wherein the first layer comprises a cerium-containing oxide represented by a general formula $(CeO_2)_{1-2x}(B_2O_3)_x$ (where B is any one of Sm, Gd and Y, and $0.05 \leq X \leq 0.15$), and the third layer comprises a zirconia material doped with at least scandia and yttria.

21. The solid oxide fuel cell according to claim 1, wherein the first layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr), and the third layer comprises a zirconia material doped with at least scandia and yttria.

22. The solid oxide fuel cell according to claim 1, wherein the first layer and the third layer comprise a zirconia material doped with at least scandia and yttria.

23. The solid oxide fuel cell according to claim 7, wherein the amount of scandia in the scandia-doped zirconia material is 3 to 12 mol %.

24. The solid oxide fuel cell according to claim 7, wherein the scandia-doped zirconia material is further doped with at least one oxide of 5 mol % or less which is selected from a group consisting of $CeO_2$, $Sm_2O_3$, $Gd_2O_3$, $Yb_2O_3$, $Er2O_3$ and $Bi_2O_3$.

25. The solid oxide fuel cell according to claim 6, wherein the total amount of scandia and yttria in the zirconia material doped with scandia and yttria is 3 to 12 mol %.

26. The solid oxide fuel cell according to claim 6, wherein the zirconia material doped with scandia and yttria is further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

27. The solid oxide fuel. cell according to claim 5, wherein the amount of yttria in the yttria-doped zirconia material is 3 to 12 mol %.

28. The solid oxide fuel cell according to claim 1, wherein an air-electrode-side reaction layer having open pores is interposed between the electrolyte membrane and the air electrode so as to accelerate the reaction of forming oxygen ion from oxygen gas and electron.

29. The solid oxide fuel cell according to claim 28, wherein the air-electrode-side reaction layer is a layer in which lanthanum manganite represented by $(La_{1-x}Ax)_yMnO_3$ (where A is either Ca or Sr) and scandia-doped zirconia are evenly mixed.

30. The solid oxide fuel cell according to claim 1, wherein the air electrode comprises lanthanum manganite represented by $(La_{1-x}Ax)_yMnO_3$ (where A is either Ca or Sr).

31. The solid oxide fuel cell according to claim 1, wherein the fuel electrode comprises a layer in which NiO and yttria-doped zirconia are evenly mixed, or Ni and yttria-doped zirconia are evenly mixed.

32. The solid oxide fuel cell according to claim 1, wherein the interconnector comprises Ca-doped lanthanum chromite.

33. The solid oxide fuel cell according to claim 28, wherein the electrolyte membrane is formed on a surface of the air-electrode-side reaction layer, and thereafter sintered at 1350 to 1500° C.

34. The solid oxide fuel cell according to claim 1, wherein the electrolyte membrane is formed on a surface of the fuel-electrode-side reaction layer, and thereafter sintered at 1350 to 1500° C.

* * * * *

UNITED STATES PATENT AND TRADEMARK OFFICE
CERTIFICATE OF CORRECTION

PATENT NO.         : 7,462,412 B2                                            Page 1 of 4
APPLICATION NO. : 11/071114
DATED                  : December 9, 2008
INVENTOR(S)        : Hiwatashi It is certified that error appears in the above-identified patent and that said Letters Patent is hereby corrected as shown below:

Title page:
Item (54), under "ABSTRACT", 5th line, change "the other surface" to --the other surface of--.

Column 1:
Lines 45-46, change "gadolinia or the like has" to --gadolinia, or the like, has--.

Column 2:
Line 48, change "$\frac{1}{2}O_2 + 2e^- \rightarrow O^-$" to --$\frac{1}{2}O_2 + 2e^- \rightarrow O^{2-}$--.

Column 3:
Line 40, change "and thereby a solid" to --and, thereby, a solid--.

Column 4:
Line 32, end paragraph with "doped zirconia."; begin a new paragraph with "By using a".

Column 9:
Line 63, change "rhombohederal" to --rhombohedral--.

Column 10:
Line 19, change "rhombohederal" to --rhombohedral--.
Line 33, change "deral crystals" to --dral crystals--.
Line 61, change "rhombohederal" to --rhombohedral--.

Column 11:
Line 7, change "rhombohederal" to --rhombohedral--.

Column 12:
Lines 2-3, change "oxygen ion ($O_2^-$)." to --oxygen ion ($O^{2-}$).--.

Column 13:
Line 5, change "amount (O) is represented" to --amount (Q) is represented--.

UNITED STATES PATENT AND TRADEMARK OFFICE
CERTIFICATE OF CORRECTION

PATENT NO. : 7,462,412 B2
APPLICATION NO. : 11/071114
DATED : December 9, 2008
INVENTOR(S) : Hiwatashi It is certified that error appears in the above-identified patent and that said Letters Patent is hereby corrected as shown below:

Column 14:
    Line 5, change "temperature x-axis)" to --temperature (x-axis)--.

Column 15:
    Line 33, change "$Bi_2O_3$ or the like may be used." to --$Bi_2O_3$, or the like, may be used.--.

Column 16:
    Line 62, change "oxide, or the like is" to --oxide, or the like, is--.

Column 19:
    Line 30, change "high mass" to --high-mass--.

Column 21:
    Line 35, change "tion (2) and (3)" to --tions (2) and (3)--.

Column 22:
    Line 47, change "to NiO/CSZ)" to --to as NiO/CSZ)--.

Column 23:
    Line 6, end paragraph with "fuel cells."; begin a new paragraph with "The amount of Ca".
    Line 14 and line 16, change "inter-connector" to --interconnector--.

Column 25:
    Line 20, change "average particle diameters" to --average particle diameter--.

Column 27:
    Line 45, change "amount of the gas permeated" to --amount of gas that permeated--.

Column 28:
    Line 50, change "$(CeO_2)0.8(Gd_2O_3)_{0.1}$." to --$(CeO_2)_{0.8}(Gd_2O_3)_{0.1}$.--.

Column 29:
    Line 21, change "amount of the gas permeated" to --amount of gas that permeated--.

UNITED STATES PATENT AND TRADEMARK OFFICE
CERTIFICATE OF CORRECTION

PATENT NO. : 7,462,412 B2
APPLICATION NO. : 11/071114
DATED : December 9, 2008
INVENTOR(S) : Hiwatashi It is certified that error appears in the above-identified patent and that said Letters Patent is hereby corrected as shown below:

Column 30:
  Line 58, change "$Co_{0.0850}O_3$." to --$Co_{0.085}O_3$.--.

Column 31:
  Line 31, change "$Ga_{0.8}Mg_{0.2o3}$" to --$Ga_{0.8}Mg_{0.2}O_3$--.
  Line 55, change "amount of the gas permeated" to --amount of gas that permeated--.

Column 33:
  Line 59, change "Fuel: $(H_{2+11}\%H_2O):N_2=1:2$" to --Fuel: $(H_2 + 11\%H_2O) : N2 = 1 : 2$--.

Column 34:
  Line 1, change "amount of the gas permeated" to --amount of gas that permeated--.

Column 35:
  Line 33, change "amount of the gas permeated" to --amount of gas that permeated--.

Column 36:
  Line 4, change "Examples 1" to --Example 1--.
  Line 6, change "Fuel: $(H_{2+11}\%H_2O):N_2=1:2$" to --Fuel: $(H_2 + 11\%H_2O) : N2 = 1 : 2$--.
  Line 61, change "a yttria-doped" to --an yttria-doped--.

Column 37:
  Line 3, line 19, and line 23, change "$(CeO_2)_{1-2x}$" to --$(CeO_2)_{1-2x}$--.
  Line 28, change "$La_{1-a}A_aGa_{1-b}B_bO_3$ or $La_{1-a}A_aGa_{1-b-c}$" to --$La_{1-a}A_aGa_{1-b}B_bO_3$ or $La_{1-a}A_aGa_{1-b-c}$--.
  Line 30, change "an the third layer" to --and the third layer--.
  Line 32 and line 38, change "$(CeO_2)_{1-2x}$" to --$(CeO_2)_{1-2x}$--.
  Lines 43-44, change "$La_{1-a}A_aGa_{1-b}B_bO_3$ or $La_{1-a}A_aGa_{1-b-c}B_bC_cO_3$" to --$La_{1-a}A_aGa_{1-b}B_bO_3$ or $La_{1-a}A_aGa_{1-b-c}B_bC_cO_3$--.
  Line 48, change "$(CeO_2)_{1-2x}$" to --$(CeO_2)_{1-2x}$--.
  Line 51, lines 57-58, and lines 64-65, change "$La_{1-a}A_aGa_{1-b}B_bO_3$ or $La_{1-a}A_aGa_{1-b-c}B_bC_cO_3$" to --$La_{1-a}A_aGa_{1-b}B_bO_3$ or $La_{1-a}A_aGa_{1-b-c}B_bC_cO_3$--.

UNITED STATES PATENT AND TRADEMARK OFFICE
CERTIFICATE OF CORRECTION

PATENT NO.       : 7,462,412 B2
APPLICATION NO. : 11/071114
DATED            : December 9, 2008
INVENTOR(S)      : Hiwatashi It is certified that error appears in the above-identified patent and that said Letters Patent is hereby corrected as shown below:

Column 38:
    Line 7, change "$(CeO_2)_{1-2x}$" to --$(CeO_2)_{1-2x}$--.
    Line 12, change "$La_{1-a}A_aGa_{1-b}B_bO_3$ or $La_{1-a}A_aGa_{1-b-c}$" to --$La_{1-a}A_aGa_{1-b}B_bO_3$ or $La_{1-a}A_aGa_{1-b-c}$--.
    Line 26, change "$Er2O_3$" to --$Er_2O_3$--.
    Line 36, between "solid oxide fuel" and "cell", delete the period.
    Line 46 and line 50, change "$(La_{1-x}Ax)_yMnO_3$" to --$(La_{1-x}A_x)_yMnO_3$--.

Signed and Sealed this

Seventeenth Day of March, 2009

JOHN DOLL
*Acting Director of the United States Patent and Trademark Office*